US009491666B2

(12) United States Patent
Tiwari

(10) Patent No.: US 9,491,666 B2
(45) Date of Patent: Nov. 8, 2016

(54) METHODS FOR HANDLING PS AND CS COMMUNICATION SERVICE

(71) Applicant: HTC Corporation, Taoyuan, Taoyuan County (TW)

(72) Inventor: Kundan Tiwari, Taoyuan (TW)

(73) Assignee: HTC Corporation, Taoyuan (TW)

( * ) Notice: Subject to any disclaimer, the term of this patent is extended or adjusted under 35 U.S.C. 154(b) by 611 days.

(21) Appl. No.: 13/892,749

(22) Filed: May 13, 2013

(65) Prior Publication Data
US 2013/0279442 A1 Oct. 24, 2013

Related U.S. Application Data

(62) Division of application No. 13/151,956, filed on Jun. 2, 2011.

(60) Provisional application No. 61/350,752, filed on Jun. 2, 2010, provisional application No. 61/353,970, filed on Jun. 11, 2010.

(51) Int. Cl.
*H04W 4/22* (2009.01)
*H04W 36/00* (2009.01)
(Continued)

(52) U.S. Cl.
CPC ....... *H04W 36/0022* (2013.01); *H04W 76/007* (2013.01); *H04W 36/28* (2013.01); *H04W 76/025* (2013.01); *H04W 88/06* (2013.01)

(58) Field of Classification Search
CPC ............ H04W 36/0027; H04W 36/0011; H04W 36/0016; H04W 36/0033; H04W 36/0094; H04M 2242/04; H04M 1/72536; H04M 1/72577; H04M 3/42; H04L 67/00; H04L 69/24

USPC .................. 370/331, 332; 455/436
See application file for complete search history.

(56) References Cited

U.S. PATENT DOCUMENTS 6,452,911 B1  9/2002  Seo
7,382,750 B2  6/2008  Wu
(Continued)

FOREIGN PATENT DOCUMENTS

TW  200715789 A  4/2007
TW  200926726 A  6/2009
(Continued)

OTHER PUBLICATIONS

3GPP TS 22.101 9.0.0, (Jun. 2008), 3rd Generation Partnership Project; Technical Specification Group Services and System Aspects Service aspects; Service principles (Release 9).
(Continued)

*Primary Examiner* — Wutchung Chu
(74) *Attorney, Agent, or Firm* — Birch, Stewart, Kolasch & Birch, LLP

(57) ABSTRACT

Methods for handling PS and CS voice services between a mobile communication device and a service network are provided. The method includes providing, by the service network, a first type of communication service to the mobile communication device and concurrently receiving, by the service network, a service request message to request for establishment of a second type of communication service, determining, by the service network, whether any type of communication service is an emergency service, and declining, by the service network, the type of communication service that is not the emergency service, wherein the service network only supports one type of communication service to the mobile communication device at one time.

1 Claim, 19 Drawing Sheets

(51) Int. Cl.
*H04W 76/00* (2009.01)
*H04W 36/28* (2009.01)
*H04W 76/02* (2009.01)
*H04W 88/06* (2009.01)

(56) References Cited

U.S. PATENT DOCUMENTS

| | | | |
|---|---|---|---|
| 8,135,413 B2* | 3/2012 | Dupray | H04W 4/02 455/456.1 |
| 8,249,019 B2 | 8/2012 | Mahdi | |
| 8,433,282 B2* | 4/2013 | You | H04W 36/0022 370/331 |
| 8,559,915 B2* | 10/2013 | Shi | H04W 4/22 370/328 |
| 2005/0036446 A1 | 2/2005 | Jang et al. | |
| 2005/0272449 A1* | 12/2005 | Gallagher | H04W 36/14 455/458 |
| 2007/0060097 A1* | 3/2007 | Edge | H04L 65/4007 455/404.1 |
| 2007/0149166 A1* | 6/2007 | Turcotte | H04W 4/22 455/404.1 |
| 2007/0183438 A1 | 8/2007 | Song et al. | |
| 2007/0195785 A1 | 8/2007 | Song et al. | |
| 2008/0026752 A1* | 1/2008 | Flore | H04W 36/0022 455/435.2 |
| 2008/0075067 A1 | 3/2008 | Guglielmi et al. | |
| 2008/0214240 A1* | 9/2008 | Choi | H04W 4/22 455/558 |
| 2009/0010247 A1 | 1/2009 | Stille | |
| 2009/0238143 A1 | 9/2009 | Mukherjee et al. | |
| 2009/0268673 A1 | 10/2009 | Roberts | |
| 2009/0268690 A1 | 10/2009 | Sebire | |
| 2009/0296660 A1 | 12/2009 | Weng | |
| 2010/0054209 A1* | 3/2010 | Mahdi | H04W 36/0022 370/331 |
| 2010/0202407 A1* | 8/2010 | Edge | H04W 36/385 370/331 |
| 2010/0296484 A1 | 11/2010 | Wu | |
| 2010/0311386 A1* | 12/2010 | Edge | H04W 36/0022 455/404.1 |
| 2010/0329244 A1* | 12/2010 | Buckley | H04W 76/026 370/352 |
| 2011/0110302 A1* | 5/2011 | Faurie | H04W 36/0022 370/328 |
| 2011/0165856 A1* | 7/2011 | You | H04W 36/0022 455/404.1 |
| 2011/0200011 A1 | 8/2011 | Rune | |
| 2011/0280217 A1* | 11/2011 | Drevon | H04W 48/18 370/331 |
| 2011/0299429 A1* | 12/2011 | Tiwari | H04W 36/0022 370/259 |
| 2011/0299501 A1 | 12/2011 | Keller et al. | |
| 2012/0087339 A1 | 4/2012 | Wu | |
| 2012/0224564 A1 | 9/2012 | Paisal et al. | |
| 2013/0223347 A1* | 8/2013 | Silver | H04W 76/025 370/328 |

FOREIGN PATENT DOCUMENTS

| | | |
|---|---|---|
| WO | WO 2007/081146 A1 | 7/2007 |
| WO | WO 2008/002997 A2 | 1/2008 |
| WO | WO 2009/089085 A1 | 7/2009 |

OTHER PUBLICATIONS

3GPP TS 22.173, V9.4.0, (Dec. 2009), 3rd Generation Partnership Project; Technical Specification Group Services and System Aspects; IP Multimedia Core Network Subsystem (IMS) Multimedia Telephony Service and supplementary services; Stage 1 (Release 9).
3GPP TS 23.009, V91.0 (Mar. 2010), 3rd Generation Partnership Project; Technical Specification Group Core Network and Terminals; Handover procedures (Release 9).
3GPP TS 23.216, V9.3.0 (Mar. 2010), 3rd Generation Partnership Project; Technical Specification Group Services and System Aspects; Single Radio Voice Call Continuity (SRVCC); Stage 2 (Release 9).
European Search Report dated Oct. 19, 2012.
3rd Generation Partnership Project, "Technical Specification Group Core Network and Terminals; Combining CS Calls and IMS Sessions; Stege 3 (Release 7)," 3GPP TR 24.879, V7.0.0, EPO Server date Mar. 21, 2006, pp. 1-73, XP-50909898A.
3rd Generation Partnership Project, "Technical SpecificationGroup Services and System Aspects; Combining Circuit Switched (CS) and IP Multimedia Subsystems (IMS) Services; Stage 2 (Release 9)," 3GPP TS 23.279, V9.0.0, EPO Server date Dec. 11, 2009, pp. 1-36, XP-50400710A.

* cited by examiner

METHODS FOR HANDLING PS AND CS COMMUNICATION SERVICE

CROSS REFERENCE TO RELATED APPLICATIONS

This application is a divisional of U.S. application Ser. No. 13/151,956 filed Jun. 2, 2011, which claims priority of U.S. Provisional Application No. 61/350,752, filed on Jun. 2, 2010 and U.S. Provisional Application No. 61/353,970, filed on Jun. 11, 2010, and the entirety of which is incorporated by reference herein.

BACKGROUND OF THE INVENTION

1. Field of the Invention

The present invention relates to handling of communication services, and in particular relates to methods for handling Packet Switched (PS) and Circuit Switched (CS) voice services in a service network or a mobile communication device that only supports one type of communication at one time.

2. Description of the Related Art

In a typical mobile communications environment, a user equipment (UE) may communicate voice and/or data signals with one or more service networks via cellular stations of the service networks. The wireless communications between the UE and the service networks may be in compliance with various wireless technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, and others.

Circuit switching is a telecommunications technology by which two network nodes establish a dedicated communications channel (circuit) before the nodes begin communicate. The circuit remains connected throughout the duration of the communications session. The circuit functions as if the nodes were physically connected as with an electrical circuit. Another type of telecommunication technology is Packet switching, where all transmitted data, regardless of content, type, or structure, are grouped into appropriate sized data blocks, called packets. Packet switching features delivery of variable-bit-rate data streams (sequences of packets) over a shared network. When traversing network adapters, switches, routers and other network nodes, packets are buffered and queued, resulting in variable delay and throughput depending on the traffic load in the network.

Different telecommunication networks employ different types of switching technologies and combinations thereof. In a legacy telecommunication network such as the GSM network, only the CS type of telecommunication technology is employed. In the GPRS and UMTS network, both the CS and the PS types are utilized for transmission. In the LTE network, only the PS type of telecommunication technology is implemented. Therefore methods are required to handle multiple PS and CS voice service for a mobile communication device which moves from one network that supports CS and PS voice services to another network that only supports one CS voice service.

BRIEF SUMMARY OF THE INVENTION

Detailed descriptions are given in the following embodiments with reference to the accompanying drawings.

An embodiment of a method of providing a circuit switched (CS) voice service and a packet switched (PS) voice service to a mobile communication device by a service network is described, comprising transmitting, by the service network, a supportability message indicating concurrent supportability of the CS voice service and the PS voice service from the service network.

Another embodiment of a handover method is disclosed, handing over a circuit-switched (CS) voice service and a packet switched (PS) voice service of a mobile communication device by a service network from a source cellular station to a target cellular station, comprising, determining, by the service network, to perform a handover procedure of the CS voice service and the PS voice service from the source cellular station to the target cellular station based on a handover measurement of a radio connection between the source cellular station and the mobile communication device, and terminating, by the service network, the CS voice service or the PS voice service when the handover procedure is determined to be performed and the target cellular station only supports one CS voice service.

Still another embodiment of a method of handing over a circuit-switched (CS) voice service and a packet switched (PS) voice service of a mobile communication device by a service network from a source cellular station to a target cellular station is revealed, comprising receiving, by the mobile communication device, a release message from the source cellular station upon determination that a handover procedure of the CS voice service and the PS voice service from the source cellular station to the target cellular station based on a handover measurement of a radio connection between the source cellular station and the mobile communication device is to be performed, and in response to the release message, releasing, by the mobile communication device, an established resource for the CS voice service and the PS voice service.

Yet another embodiment of a method of establishing communication service between a mobile communication device and a service network is provided, comprising providing, by the service network, a first type of communication service to the mobile communication device and concurrently receiving, by the service network, a service request message to request for establishment of a second type of communication service, determining, by the service network, whether any type of communication service is an emergency service, and declining, by the service network, the type of communication service that is not the emergency service, wherein the service network only supports one type of communication service to the mobile communication device at one time.

Still yet another embodiment of a method of establishing communication service between a mobile communication device and a service network is provided, comprising receiving, by the mobile communication device, a first type of communication service and concurrently receiving, by the mobile communication device, a service request message to request for establishment of a second type of communication service, determining, by the mobile communication device, whether any type of communication service is an emergency service, and declining, by the mobile communication device, the type of communication service that is not the emergency service, wherein the mobile communication device only supports one type of communication service at one time.

Still yet another embodiment of a method of establishing communication service between a mobile communication device and a service network is provided, comprising receiving, by the mobile communication device, a first type of communication service and concurrently receiving, by the mobile communication device, a service request message to request for establishment of a second type of communication service, determining, by the mobile communication device, whether any type of communication service is an emergency service, suspending, by the mobile communication device, the type of communication service that is not the emergency service when one type of communication service is an emergency service, and receiving, by the mobile device, the second type of communication service, wherein the mobile communication device only supports one type of communication service at one time.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims. The 3GPP specifications are used to teach the spirit of the invention, and the invention is not limited thereto.

Figure 1:
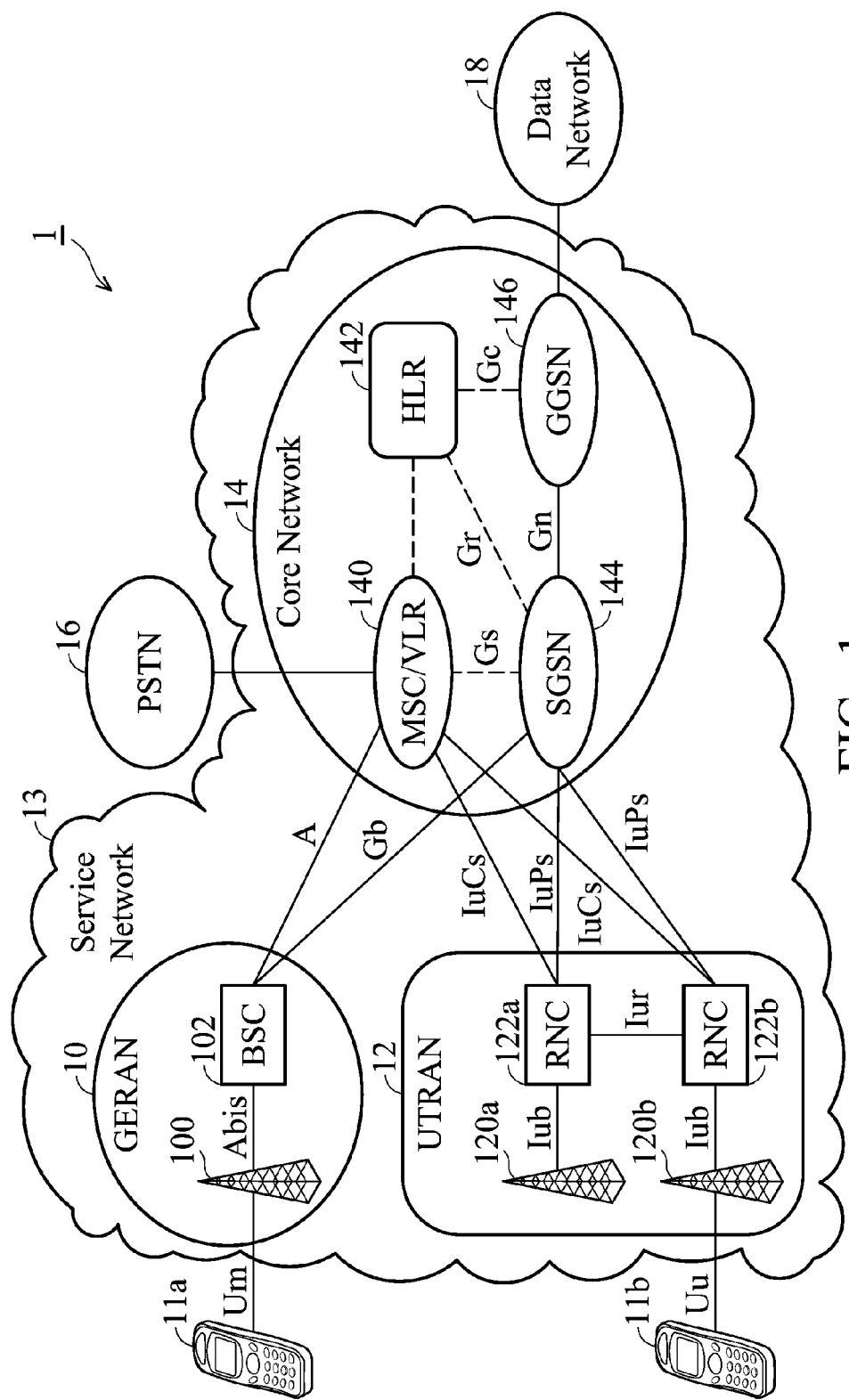
FIG. 1 is a block diagram illustrating a mobile communication environment according to an embodiment of the invention.

FIG. 1 is a block diagram illustrating a mobile communication environment according to an embodiment of the invention. The mobile communication environment 1 comprises a service network 13 that includes Global System of Mobile communication (GSM), General Packet Service (GPRS), and Universal Mobile Telecommunication System (UMTS) networks. The GSM or the GPRS network comprises a GSM Radio Access Network/GSM EDGE Radio Access Network (GRAN/GERAN) 10 and core network 14, in which the GRAN/GERAN 10 comprises a base transceiver station (BTS) 100 and a base station controller (BSC) 102. The UMTS network comprises a UMTS Terrestrial Radio Access Network (UTRAN) 12 and the core network 14, where the UTRAN 12 comprises Node B base stations 120a and 120b, and radio network controllers (RNC) 122a and 122b. The core network 14 comprises a Mobile Switching Center/Visitor Location Register (MSC/VLR) 140 and a Home Location Register (HLR) 142 belonging to a circuit switched (CS) service domain and a Serving GPRS Support Node (SGSN) 144 and a Gateway GPRS Support Node (GGSN) 146 belonging to a packet switched (PS) service domain. In FIG. 1, the dashed lines represent signaling links, and the solid lines represent data and signaling links. In the GSM/GPRS network, the mobile communication devices 11a and 11b are in connection with the BTS 100 through a radio Um interface based on the TDMA technology. The BTS 100 is in turn coupled to the BSC 102, which is connected to the MSC/VLR 140 and the SGSN 144 through frame relay links. In the UMTS network, the mobile communication devices 11a and 11b are in connection with the Node Bs 120a or 120b through a radio Uu interface based on the WCDMA technology, the Node Bs 120a and 120b are in turn coupled to the RNCs 122a and 122b, which are connected to the MSC/VLR 140 and the SGSN 144 through Lu interfaces implemented on the ATM network.

The Core Network (CN) 14 consists of two service domains: the circuit-switched (CS) service domain interfacing with a CS based network such as Public Switched Telephone Network (PSTN) or Integrated Services Digital Network (ISDN) and the packet-switched (PS) service domain interfacing with an Internet Protocol (IP) based Network such as the Internet. In the CS domain, the mobile communication device 11a and 11b are identified by International Mobile Subscriber Identity (IMSI) and Temporary Mobile Subscriber Identity (TMSI). In the PS domain, the mobile communication device 11a and 11b are identified by IMSI and Packet-TMSI (P-TMSI). The GPRS has evolved from the GSM by introducing two new core network nodes which are the Serving GPRS Support Node (SGSN) and Gateway GPRS Support Node (GGSN). Existing GSM nodes (BSS, the MSC/VLR, and HLR) have been upgraded to support the communication interfaces with the PS service domain nodes including the SGSN 144 and the GGSN 146. In the UMTS network, every Node B is connected to an RNC through an Iub interface. The RNC 122a and 122b are then coupled to the SGSN 144 through IuPS interfaces and to the MSC/VLR 140 through IuCS interfaces. An RNC may connect to several other RNCs through the Iur interfaces. Unlike the RNCs in the UMTS network, the BSCs in the GSM/GPRS do not connect to one another.

Three network modes of operation (NMO, also known as Network Operation Modes) are defined in the GPRS network, namely NMO1, NMO2, and NMO3, where the NMO 1 allows simultaneous CS and PS connections, the NMO2 provides an automatic CS or PS connection for only one service type at one time, and the NMO 3 only supports a PS connection. The network mode has been removed from the UMTS network. Three operation modes are defined for the GPRS mobile station (MS), namely Class A MS, Class B MS, and Class C MS. The Class A MS supports concurrent CS and PS connections, Class B MS provides only one CS or PS connection at one time, and Class C MS only supports a PS connection. In the UMTS network, the UMTS user equipment (UE) is classified in 3 types, i.e., a PS/CS mode UE equivalent to the GPRS Class A MS, a PS mode UE equivalent to the GPRS Class C MS, and a CS mode UE capable of attaching to the CS service domain only.

The mobile communication devices 11a and 11b are any devices used directly by an end-user for communications, e.g., handhold mobile phones, laptop determiners equipped with broadband network adaptors, or any other device capable of communications. The mobile communication devices 11a and 11b comprise a baseband module (not shown) and an analog module (not shown). The baseband module may comprise hardware to perform baseband signal processing including digital signal processing, coding and decoding, and so on. The analog module may comprise hardware to perform analog to digital conversion (ADC), digital to analog conversion (DAC), gain adjusting, modulation, demodulation, and so on. The analog module may receive RF signals from the BTS 100 or Node B 120 and down-convert the received RF wireless signals to baseband signals to be processed by the baseband unit, or receive baseband signals from the baseband unit to up-convert the received baseband signals to RF wireless signals for uplink transmission. The analog module comprises a mixer to up-convert the baseband signals with a component carrier signal oscillated at a radio frequency of the wireless communications system. The radio frequency may be 900 MHz, 1900 MHz, or 2100 MHz utilized in WCDMA systems, or may be 900 MHz, 2100 MHz, or 2.6 GHz utilized in LTE systems, or others depending on the radio access technology (RAT) in use.

The CS voice services are divided into circuit teleservices defined by the 3GPP TS 22.003 specification and bearer services defined by the 3GPP TS 22.002 specification, wherein both services can utilize standardized supplementary services defined by the 3GPP TS 22.004 specification. One of the PS voice services provided by the service network 13 is an IP Multimedia Subsystem (IMS) service that delivers IP multimedia services. The IMS Multimedia Telephony communication is a communication service between point-to-point terminals or between a terminal and a network entity, including full duplex speech, simplex or full duplex real time video that is synchronized with speech if present, text communication, file transfer, video clip sharing, picture sharing, and audio clip sharing.

When a mobile communication device is receiving an ongoing PS voice service such as an IMS multimedia telephony service while moving from one area that supports PS communication services to another area that only supports CS communication services, the service network is required to provide continuity between the full duplex speech component of the IMS multimedia telephony service to a CS teleservice with no negative impact upon the voice service for a user. The continuity between the PS and CS service domains are referred to as single radio voice call continuity (SRVCC). To ensure the SRVCC while moving from the PS to CS service domains, the service network 13 is required to prepare a target access network i.e., the GRAN/GERAN 10, for an SRVCC handover, while the mobile communication device 11b is connected to the source system, i.e., the UTRAN 12. The SRVCC does not only support a seamlessly handover for a single voice session, it can also be used if the voice call occurs in combination with a non-voice service, such as video streaming. Only the direction from the UTRAN PS to CS is considered for the SRVCC. The underlying assumption is that the CS coverage exists virtually everywhere, and then there is no need to continue a CS call in PS, if the corresponding coverage is entered.

Figure 2:
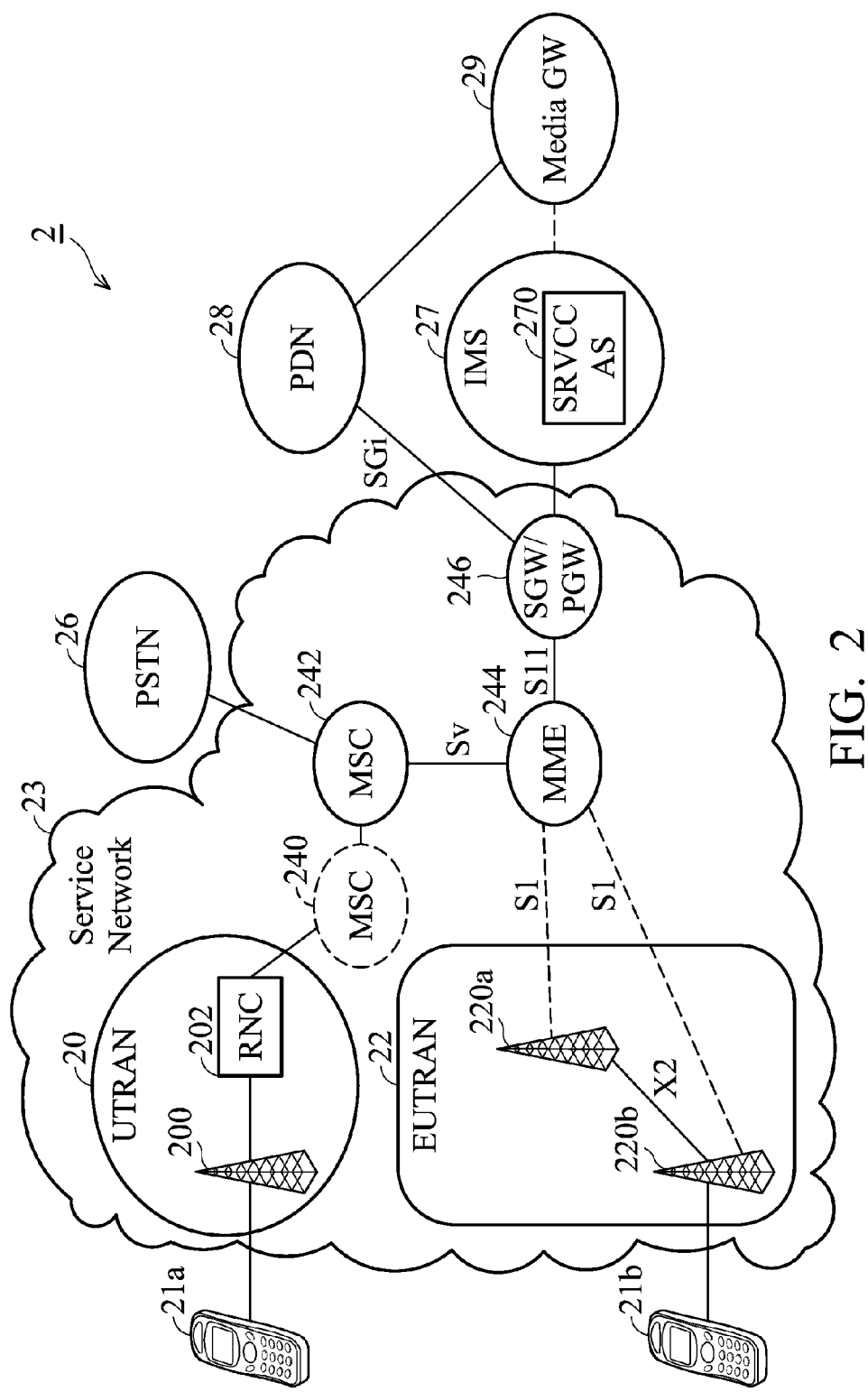
FIG. 2 is a block diagram illustrating another mobile communication environment according to an embodiment of the invention.

FIG. 2 is a block diagram illustrating another mobile communication environment according to an embodiment of the invention. The mobile communication environment 2 comprises a service network 23 that includes UMTS and Long Term Evolution (LTE) networks. The architecture of the UMTS network is similar to those in the UMTS network in FIG. 1, and reference can be made to the description in FIG. 1 for the explanation for the connection and operation thereof. The LTE network comprises an Evolved UTRAN (EUTRAN) 22, a Mobility Management Entity (MME) 244, and Serving Gateway/PDN Gateway (SGW/PGW) 246. The MME 244 and SGW/PGW 246 belong to the PS service domain. The EUTRAN 22 comprises the Evolved Node Bs (eNB) 220a and 220b communicating to each other though an X2 interface.

A specially enhanced MSC 242 and a control unit thereof are connected via a control plane interface, and an Sv interface, to the MME 244. Note that the MSC 240 serving the mobile communication device 21a or 21b may be different from the one supporting the Sv interface. In the IMS, an application server for an SRVCC is required. The Sv interface is based on the GTPv2 protocol and enables preparation of resources in the target system, which includes the access of the core network, and interconnection between the CS and IMS domain, while the mobile communication device 21a or 21b is still connected to the source access network. The voice call is anchored in the IMS before the SRVCC handover. As the mobile communication device 21a or 21b moves, it performs measurement of the radio signal including strength and quality of transmissions, both for the EUTRAN cell it is currently using and the neighboring GERAN/UTRAN cells. The measurement reports are sent to the serving cell and used to determine the handover point, and eventually the target cell to be used after handover. In this process the indication of the ongoing voice call, the SRVCC supportability of the mobile communication device 21a or 21b and the voice support of GERAN/UTRAN cells are utilized. The policy of the network operator with respect to the mobile communication device's SRVCC behavior is administered by OMA Device Management and a specific Management Object for performing SRVCC is transferred to the mobile communication device 21a or 21b, containing settings for numbers to be used in a session transfer request, preference of transfer directions, preference of media in different access systems, and detailed conditions on when the transfer will take place. The eNB then sends an SRVCC trigger message to the MME 244, which initiates the inter-system handover via a trigger message across the Sy interface, which leads to resource reservation in a GERAN/UTRAN similar to an intra CS handover. The MSC server initiates signaling for call establishment towards the SRVCC AS 270. After resource reservation has been acknowledged back to the MME 244, the MME 244 commands the mobile communication device 21a or 21b to move to the GERAN/UTRAN. The mobile communication device 21a or 21b then acknowledges the SRVCC handover completion to the target cell in the GERAN/UTRAN.

In the UMTS and LTE systems, the mobile communication device 21a or 21b may receive an ongoing IMS telephony service and a CS voice service concurrently. As the mobile communication device 21a or 21b moves to another cell or location area, the service network performs an SRVCC handover for the IMS telephony service and a CS handover for the CS voice service.

Figure 3A:
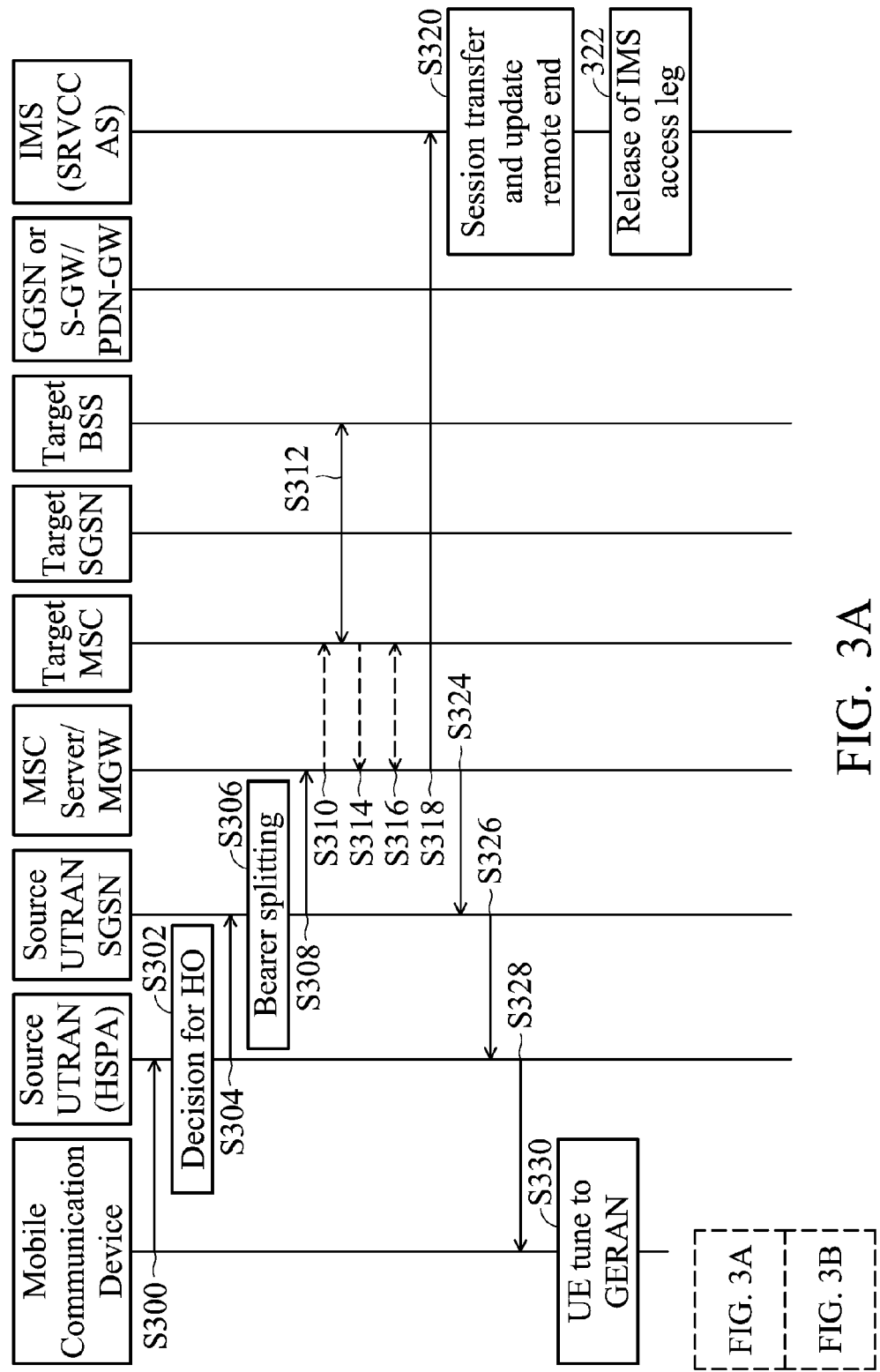
FIG. 3A and FIG. 3B are a message sequence chart depicting a SRCVCC handover procedure from a PS domain to a CS domain performed by a service network.
Figure 3B:
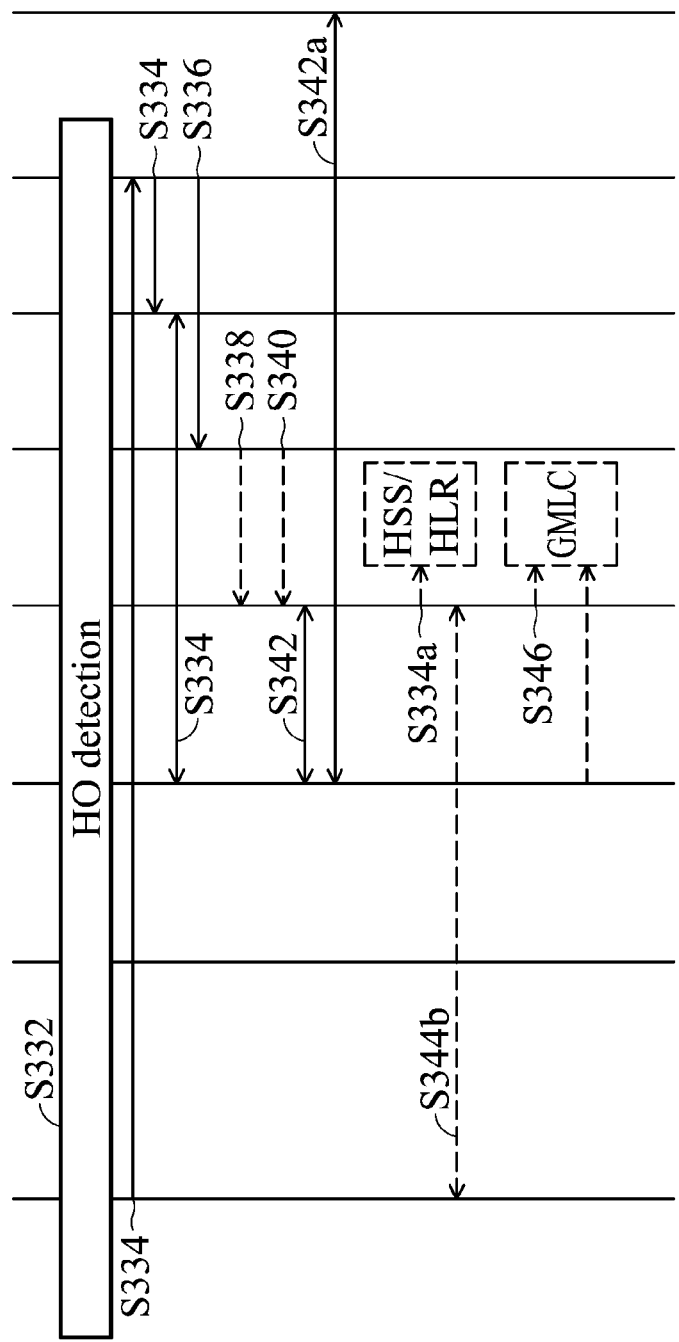

FIG. 3A and FIG. 3B are a message sequence chart depicting a SRCVCC handover procedure from a PS domain to a CS domain performed by a service network. The SRCVCC handover procedure illustrates a call flow for the SRVCC from a High Speed Packet Access (HSPA) to GSM/EDGE Radio Access Network (GERAN) without Dual Transfer Mode (DTM) support, requiring that the Node B determine that the target is a GERAN without the DTM support or that the mobile communication device has no DTM support.

In Step S300, the mobile communication device sends measurement reports to the Source UTRAN (HSPA).

In Step S302, based on the mobile communication device measurement reports the source UTRAN (HPSA) decides to trigger a handover to the GERAN.

In Step S304, the source UTRAN (HSPA) sends a Relocation Required (Target ID, source to Target Transparent Container, SRVCC Handover Indication) message to the source SGSN. The UTRAN (HSPA) includes the "old BSS to new BSS information IE" for the CS domain. The SRVCC Handover Indication indicates to the SGSN that this is an SRVCC handover operation that only occurs from the PS to CS domain. The message includes an indication that the mobile communication device is not available for PS voice service in the target cell.

In Step S306, based on the Traffic Class associated with conversational and Source Statistic Descriptor=speech, and the SRVCC Handover Indication the source SGSN splits the voice bearer from the non-voice bearers and initiates the PS-CS handover procedure for the voice bearer only towards MSC server.

In Step S308, the source SGSN sends an SRVCC PS to CS Request (IMSI, a target ID, STN-SR, C-MSISDN, source to Target Transparent Container, MM Context, and Emergency Indication) message to the MSC Server. The Emergency Indication is included if an ongoing session is an emergency session. For the case of a mobile communication device operating in a Limited Service State, the SGSN includes the equipment identifier in the message. Authenticated IMSI and C-MSISDN shall also be included if available. The SGSN receives the STN-SR and C-MSISDN from the HSS as part of the subscription profile downloaded during the UTRAN (HSPA) attach procedure. The MM Context contains security related information. The CS Security key is derived by the SGSN from the UTRAN (HSPA)/EPS domain key as defined by the TS 33.102 [25] specification.

In Step S310, the MSC Server interworks the PS handover request with a CS inter-MSC handover request by sending a Prepare Handover Request message to the target MSC. The MSC Server uses BSSMAP encapsulated for the Prepare Handover Request.

In Step S312, a target MSC performs resource allocation with the target BSS by exchanging Handover Request/Acknowledge messages.

In Step S314, a target MSC sends a Prepare Handover Response message to the MSC Server.

In Step S316, a circuit connection between the target MSC and the MGW associated with the MSC Server is established e.g. using ISUP IAM and ACM messages.

In Step S318, for a non-emergency session, the MSC Server initiates the Session Transfer by using the STN-SR e.g. by sending an ISUP IAM (STN-SR) message towards the IMS. For an emergency session, the MSC Server initiates the Session Transfer by using the locally configured E-STN-SR. Standard IMS Service Continuity or emergency IMS Service Continuity procedures are applied for execution of the Session Transfer, see the TS 23.237 [14] specification. Note that this step can be started after Step S314. Also note that if the MSC Server is using an ISUP interface, then the initiation of the session transfer for a non-emergency session may fail if the subscriber profile including the CAMEL triggers is not available prior to handover (see clause 7.3.2.1.3 of TS 23.292 [13]).

In Step S320, during the execution of the Session Transfer procedure the remote end is updated with the SDP of the CS access leg. The downlink flow of VoIP packets is switched towards the CS access leg at this point.

In Step S322, the source IMS access leg is released according to the TS 23.237 [14] specification. Note that Steps S320 and S322 are independent of Step S324.

In Step S324, the MSC Server sends an SRVCC PS to CS Response (Target to Source Transparent Container) message to the source SGSN.

In Step S326, the source SGSN sends a Relocation Command (Target to Source Transparent Container) message to the source UTRAN (HSPA). The message includes information about the voice component only. Relocation is the switching of communications equipment such as area switches during communication.

In Step S328, the source UTRAN (HSPA) sends a Handover Command message to the mobile communication device.

In Step S330, the mobile communication device tunes into the GERAN.

In Step S332, handover detection at the target BSS occurs. The mobile communication device sends a Handover Complete message via the target RNS/BSS to the target MSC.

In Step S334, The mobile communication device starts the Suspend procedure specified in the TS 23.060 [10] specification, clause 16.2.1.1.2. The TLLI and RAI pair are derived from the GUTI as described in the TS 23.003 [27] specification. This triggers the Target SGSN to send a Suspend Request (Gn/Gp SGSN) or Suspend Notification (S4 SGSN) message to the Source SGSN. The Source SGSN sends in return a Suspend Response or Suspend Acknowledge message to the Target SGSN.

In Step S336, a target BSS sends a Handover Complete message to the target MSC.

In Step S338, a target MSC sends an SES (Handover Complete) message to the MSC Server. The speech circuit is realized through connection in the MSC Server/MGW according to the TS 23.009 [18] specification.

In Step S340, the establishment procedure is completed when the ISUP Answer message is sent to the MSC Server according to the TS 23.009 [18] specification.

In Step S342, the MSC Server sends an SRVCC PS to CS Complete Notification message to the source SGSN, informing it that the mobile communication device has arrived on the target side. The Source SGSN acknowledges the information by sending an SRVCC PS to CS Complete Acknowledge message to the MSC Server.

In Step S342a, after the SGSN receives the Suspend Request/Notification in Step S334, the SGSN behaves as follows: If the SGSN uses Gn/Gp based interaction with the GGSN, then the SGSN modifies the PDP Contexts used for voice and sets the MBR to 0, and it suspends the PDP Contexts using the background or interactive class. For a PDP Context using the streaming or conversational traffic class, the PDP Context is preserved and the maximum bitrate is downgraded to 0 Kbit/s. If the SGSN uses S4 based interaction with S-GW and P-GW, then: The SGSN modifies the bearers used for voice and sets the PS-to-CS handover indicator, and deactivates other GBR bearers by deleting the GBR bearer contexts in the S-GW and P-GW. If dynamic PCC is deployed, then the P-GW shall inform the PCRF by means of an IP CAN Session Modification procedure as defined by the TS 23.203 [6] specification, wherein the voice bearers are handed over to the CS domain. The SGSN suspends the non-GBR bearers towards the S-GW and P-GW(s). The SGSN stores in the mobile communication device context that the mobile communication device is in the suspended status.

In Step S344a, if the IMSI is unknown in the VLR, the MSC Server performs a MAP Update Location to the HSS/HLR unless there is no authenticated IMSI (e.g. for an emergency services session without authenticated IMSI). Note that this Update Location is not initiated by the mobile communication device.

In Step S344b, if the MSC Server performed a MAP Update location in Step S344a and if multiple MSC/VLRs serve the same LAI, the MSC Server performs a TMSI reallocation towards the mobile communication device using a non-broadcast LAI with its own Network Resource Identifier (NRI).

In Step S346, for an emergency services session after handover is complete, the source SGSN or the MSC Server may send a Subscriber Location Report carrying the identity of the MSC Server to a GMLC associated with the source or target side, respectively, as defined by the TS 23.271 [29] specification to support location continuity. Note that any configuration of the choice between a source SGSN versus an MSC Server update to a GMLC needs to ensure that a single update occurs from one of the entities when the control plane location solution is used on the source and/or target sides.

After the CS voice call is terminated and if the mobile communication device is still in the GERAN or UTRAN (or for any other reason according to the TS 24.008 specification), then (as specified in the TS 23.060 [10] specification) the mobile communication device shall resume PS voice services by sending a Routing Area Update Request message to the SGSN. The Update Type depends on the mode of operation of the GERAN network, e.g. in mode I a Combined RA/LA Update is used and in mode II or III Routing Area Update is used. A Gn/Gp SGSN will follow the TS 23.060 [10] specification to resume the PDP Context(s). An S4 SGSN will also follow the TS 23.060 specification to resume the bearers, and will in addition inform the S-GW and P-GW(s) to resume the suspended bearers.

Figure 4:
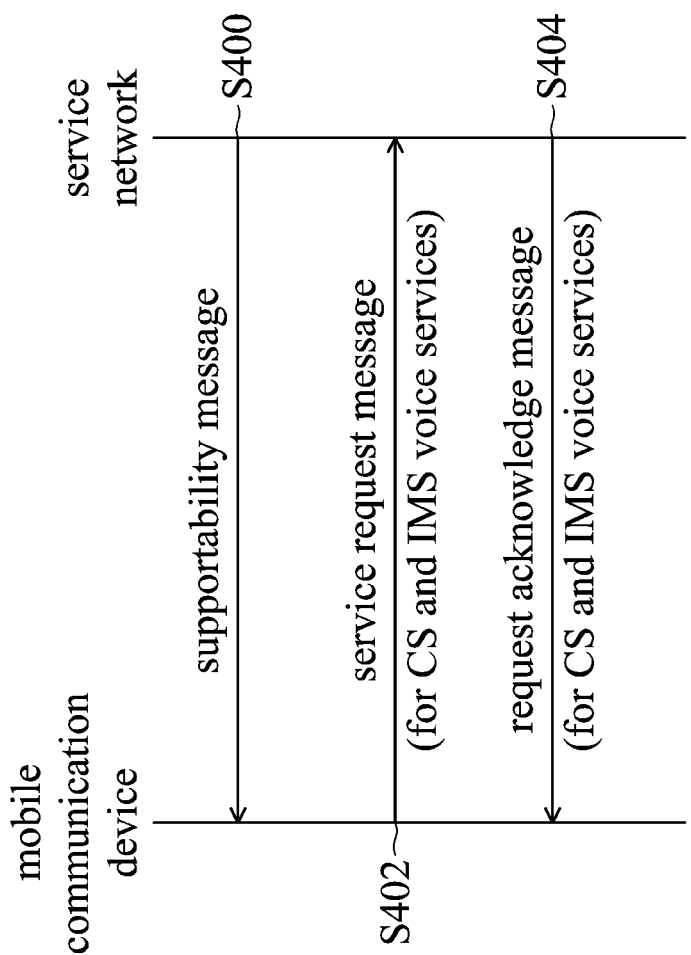
FIG. 4 is a message sequence chart illustrating a communication service provision procedure performed by a service network according to an embodiment of the invention.

FIG. 4 is a message sequence chart illustrating a communication service provision procedure performed by a service network according to an embodiment of the invention, incorporating the service network and the mobile communication device in FIG. 1 and FIG. 2. When the mobile communication device enters an area within the radio coverage of the service network, the service network transmits a supportability message indicating concurrent supportability of the CS voice service and the PS voice service from the service network (S400). The CS voice service comprises circuit teleservices and bear services. The PS voice service comprises Push to talk over cellular (PoC) services, Multimedia Messaging Services (MMS), Point-to-Point (P2P) services, Point-to-Multipoint (P2M) services, and IMS services. The concurrent supportability may be carried in a broadcast message such as a System Information message or in a dedicated message such as an Attach accept or a Location Area Accept message to the mobile communication device. Upon receiving the supportability message the mobile communication device determines the availability of concurrent CS and PS voice services from the network. When the supportability message indicates that the concurrent supportability of the CS and PS voice services, the mobile communication device can request both types of services from the service network by a service request message (S402). In response to the service request message, the service network sends a request acknowledge message (S404) to the mobile communication device to inform that the service request has been acknowledged and the requested CS and PS voice services are to be provided for. On the contrary, if the supportability message indicates that the concurrent supportability of the CS and PS voice services are not available, the mobile communication device can only request for one type of communication service at one time. If the service network receives a service request message for the CS and PS voice services despite that only one type of communication service can be provided at one time, the service network can reject the service request by sending a service request reject message to the mobile communication device.

Figure 5:
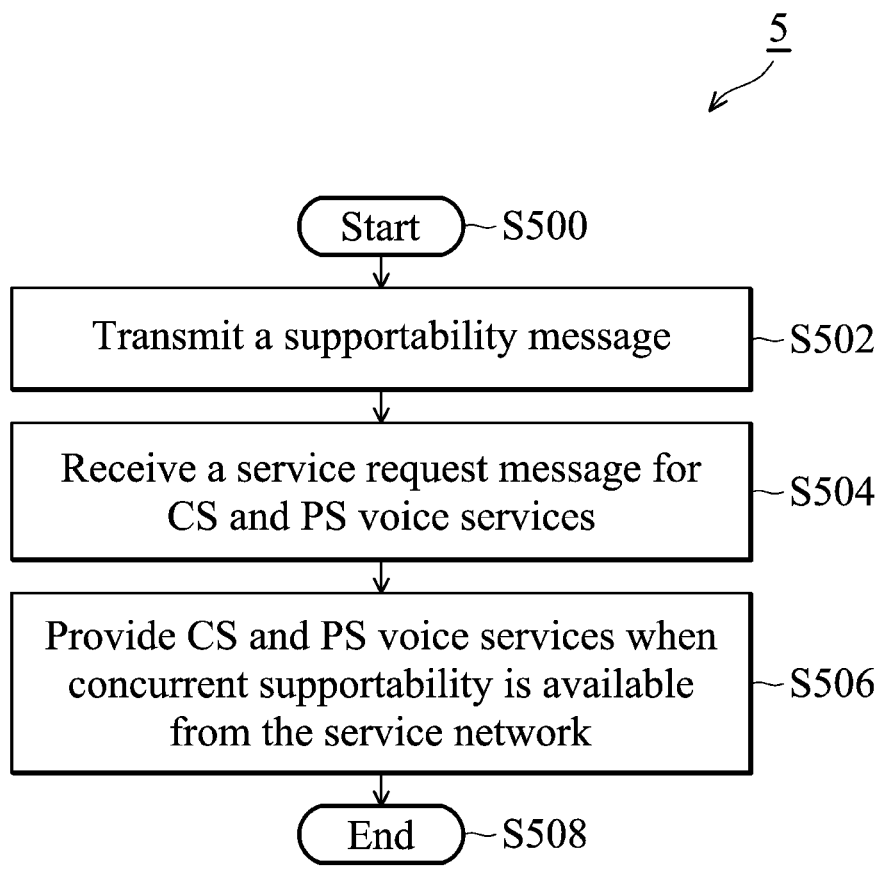
FIG. 5 is a flowchart illustrating a method for providing CS and PS voice services by a service network according to an embodiment of the invention.

FIG. 5 is a flowchart illustrating a method for providing CS and PS voice services by a service network according to an embodiment of the invention, incorporating the service network and the mobile communication device in FIG. 1 and FIG. 2. Upon startup (S500), a mobile communication device enters a service coverage of the service network, and a radio resource connection (RRC) connection is established between the mobile communication device and a radio access network (RAN), and a signaling connection control part (SCCP) is established between the RAN and an SGSN in the core network, then the mobile communication device can attach to the core network to make the presence of the mobile communication device known to the core network and obtain PS or CS voice services therefrom. Next, the service network can transmit a supportable service message (S502) indicating availability of concurrent supportability of the CS voice service and the PS voice service. The supportable service may be transmitted through a broadcast message System Information on a BCCH so that the mobile communication device can retrieve the information therefrom. The supportable service may also be transmitted through a dedicated message to the mobile communication device such as an ATTACH ACCEPT message in a PS attachment procedure or a LOCATION AREA ACCEPT message in a CS location area update procedure. When the supportable service message indicates that the service network is capable of supporting the CS and PS voice services concurrently, the mobile communication device can send a service request message to the service network to request for both the CS and PS voice services. Upon receiving the service request message (S504), the service network sends in return a request acknowledge message to the mobile communication device and provides the request CS and PS voice services thereto (S506). Then the method 5 is completed and exited (S508). The CS voice service comprises circuit teleservices and bear services. The PS voice service comprises Push to talk over cellular (PoC) services, Multimedia Messaging Services (MMS), Point-to-Point (P2P) services, Point-to-Multipoint (P2M) services, and IMS services.

Figure 6:
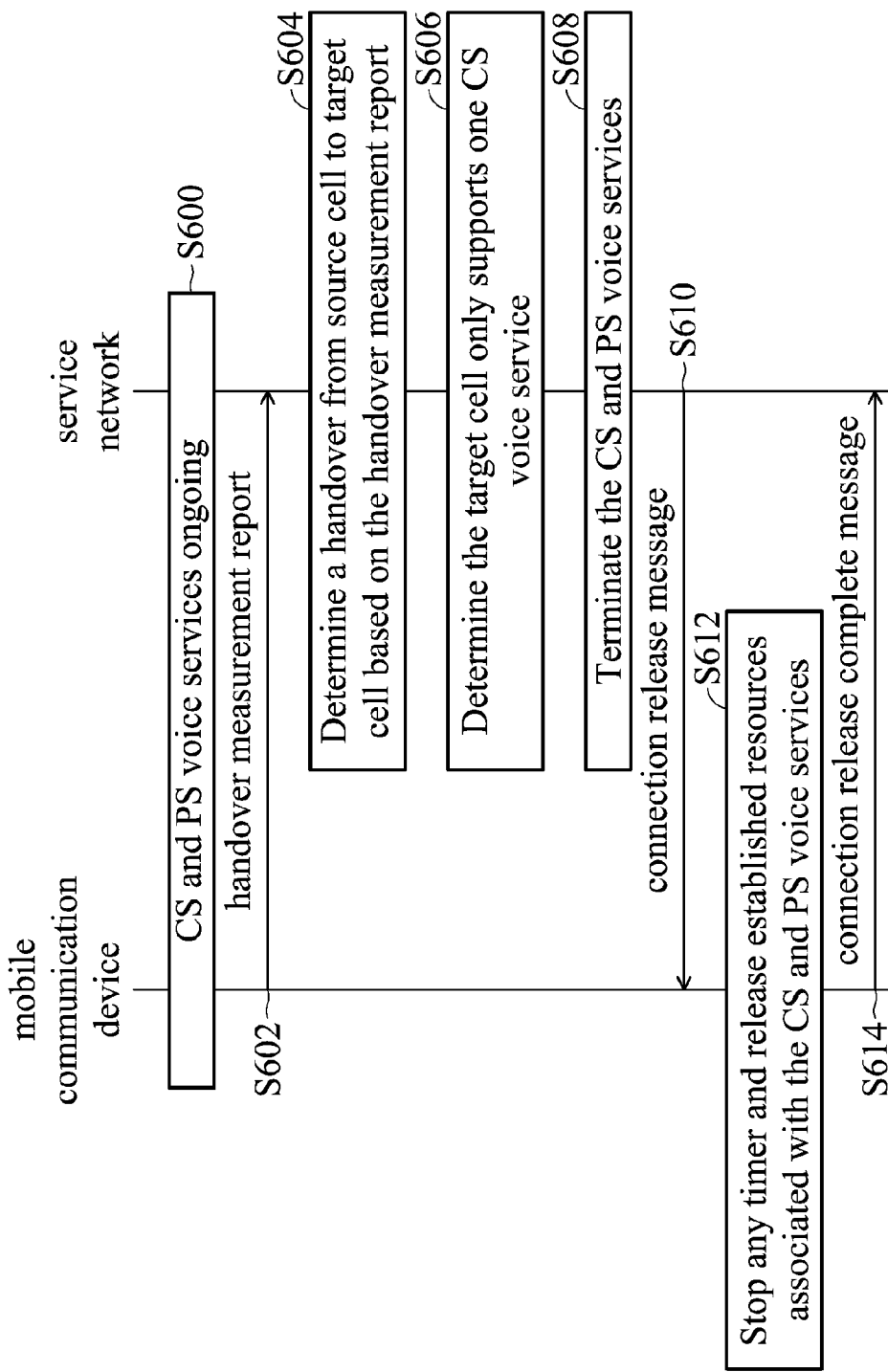
FIG. 6 is a message sequence chart illustrating a handover procedure for CS and PS voice services according to an embodiment of the invention.

FIG. 6 is a message sequence chart illustrating a handover procedure for CS and PS voice services by a service network according to an embodiment of the invention, incorporating the service network and the mobile communication device in FIG. 1 and FIG. 2. As the mobile communication device moves during the CS and PS data transmission, the mobile communication device might move into an area covered by a target cellular station that only supports one CS voice service and supports no PS voice service to the mobile communication device. Traditionally, the service network is required to prepare network resources of the target cellular station prior to a CS handover or an SRVCC handover, resulting in two CS voice services from the target cellular station to the mobile communication device after the handovers, which is not supported by the target cellular station. In the present invention, when the mobile communication device moves while receiving the CS and PS voice services from the service network via a source cellular station (S600), the service network receives a handover measurement report indicating the radio condition of radio the connection to the source cellular station and to the neighboring cellular stations (S602). The CS voice service comprises circuit teleservices and bear services. The PS voice service comprises Push to talk over cellular (PoC) services, Multimedia Messaging Services (MMS), Point-to-Point (P2P) services, Point-to-Multipoint (P2M) services, and IMS services. As the mobile communication device moves toward the target cellular station, the service network can determines a handover of the PS and CS voice services from the source cellular station to the target cellular station based on the handover measurement report (S604). Next, the service network determines whether the target cellular station can only support one CS voice service (S606). If so, the service network then initiates a procedure to terminate the CS and PS voice services (S608), and if not, the service network performs the CS and SRVCC handover procedures to transfer the radio connection from the source cellular station to the target cellular station. After terminating the CS and PS voice services and releasing established resources associated therewith, the service network sends a connection release message such as an RRC connection release message to the mobile communication device (S610). In response to the connection release message, the mobile communication device stops any timer that is ongoing and releases established resources associated with the CS and PS voice services (S612). Upon completion of established resources being released for the CS and PS voice services, the mobile communication device sends in return a connection release complete message such as an RRC connection release complete message to the service network (S614). After the termination of the CS and PS voice services, the mobile communication device may initiate the CS or the PS voice service at its choice, and the service network may provide the requested CS or PS voice service thereto through the target cellular station. The established resources comprise the MM context, the PDP context, the EPS bearer context, and the logical links.

Figure 7:
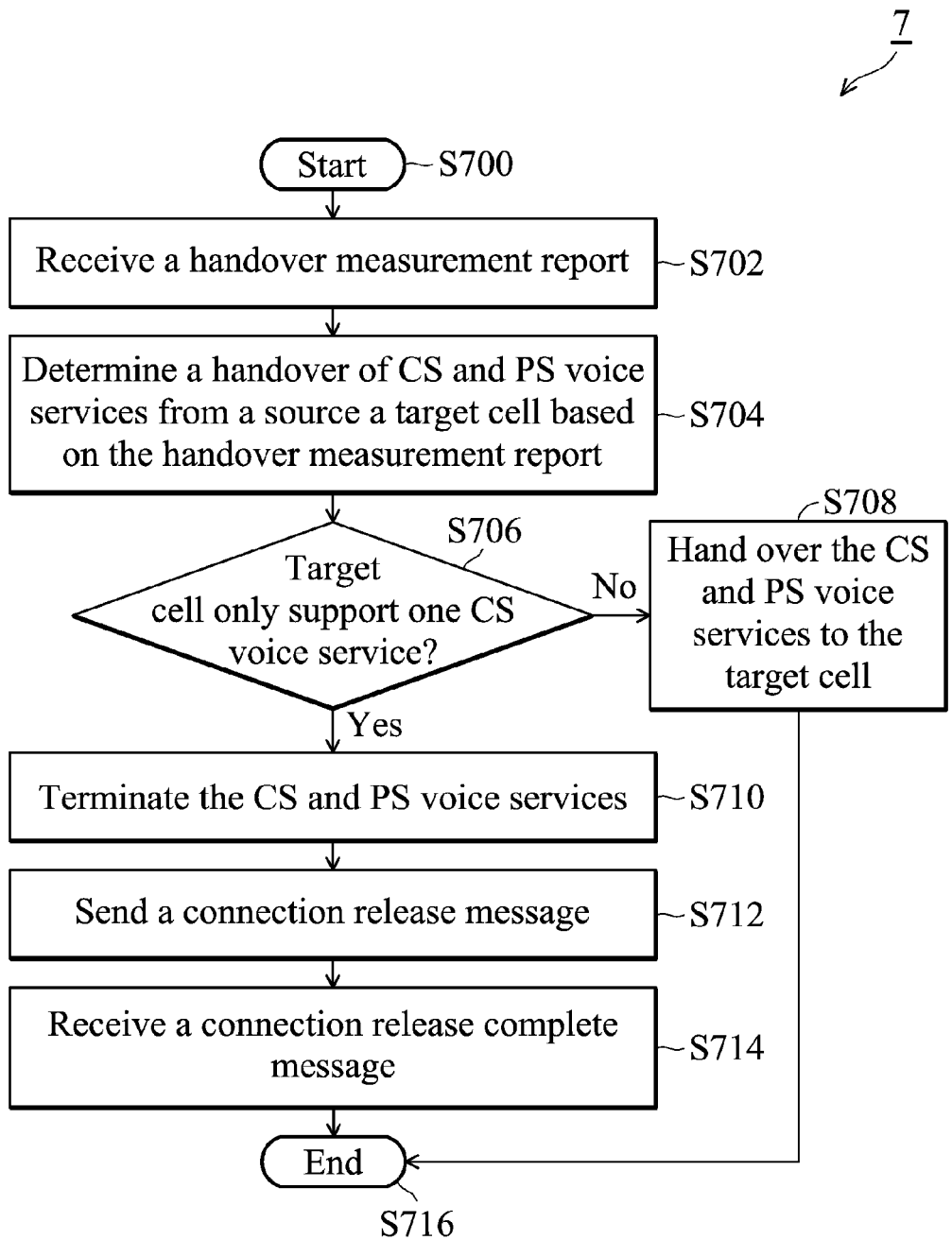
FIG. 7 is a flowchart illustrating a handover procedure for CS and PS voice services by a service network according to an embodiment of the invention.

FIG. 7 is a flowchart illustrating a handover procedure for CS and PS voice services by a service network according to an embodiment of the invention, incorporating the service network and the mobile communication device in FIG. 1 and FIG. 2. Upon startup of the handover method 7, the service network provides the CS and PS voice services to the mobile communication device (S700). The CS voice service comprises circuit teleservices and bear services. The PS voice service comprises Push to talk over cellular (PoC) services, Multimedia Messaging Services (MMS), Point-to-Point (P2P) services, Point-to-Multipoint (P2M) services, and IMS services. The service network receives a handover measurement report from the mobile communication device that indicates the radio condition of radio the connection to the source cellular station and to other neighboring cellular stations (S702). As the mobile communication device moves toward a target cellular station, the radio condition associated therewith exceeds that with the source cellular station. Thus, the service network determines a handover of CS and PS voice services from the source cellular station to the target cellular station based on the radio condition in the handover measurement report (S704). Upon the determination for the handover to the target cellular station, the service network determines whether the target cellular station only supports one CS voice service (S706). If not, the service network performs the CS and SRVCC handover procedures to transfer the PS and CS voice services to the target cellular station (S708). If so, the service network terminates both the CS and PS voice services and releases established resources associated therewith (S710) since the target station is unable to support two CS connections after the handover, and sends a connection release message to the mobile communication device to stop any timer that is ongoing and release established resources associated with the CS and PS voice services (S712). The established resources comprise the MM context, the PDP context, the EPS bearer context, and the logical links. In return, the service network receives a connection release complete message from the mobile communication device to be informed completion of network resource release (S714). The handover method 7 is then completed and exited (S716). After the completion of the handover method 7, the mobile communication device may initiate the CS or the PS voice service at its preference to establish the corresponding communications session with the service network through the target cellular station.

Figure 8:
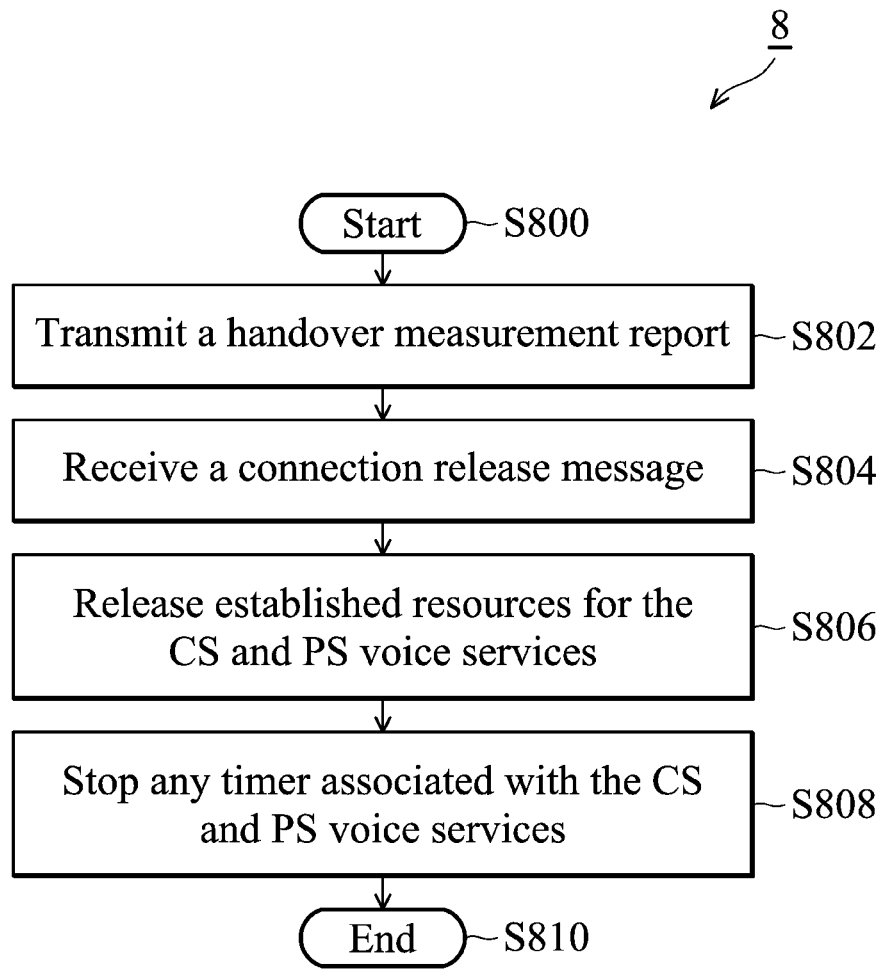
FIG. 8 is a flowchart of a handover method, handing over CS and PS voice services by a mobile communication device according to an embodiment of the invention.

FIG. 8 is a flowchart of a handover method, handling CS and PS voice services by a mobile communication device according to an embodiment of the invention, incorporating the service network and the mobile communication device in FIG. 1 and FIG. 2. Upon startup of the handover method 8, the mobile communication device receives the CS and PS voice services from the service network through a source cellular station (S800). The CS voice service comprises circuit teleservices and bear services. The PS voice service comprises Push to talk over cellular (PoC) services, Multimedia Messaging Services (MMS), Point-to-Point (P2P) services, Point-to-Multipoint (P2M) services, and IMS services. The mobile communication device monitors radio condition of radio connection to the source cellular station and other neighboring cellular stations to derive a handover measurement report and transmits the handover measurement report to the service network for a handover decision. After a handover from the source cellular station to a target cellular station is determined by the service network, and the target cellular station only supports one CS voice service, the mobile communication device receives an RRC connection release message from the service network (S804) to release established resources for the CS and PS voice services (S806) and stop the operation of any timer associated with the CS and PS voice services (S808). The handover method 8 is then completed and exited (S810). The mobile communication device may further initiate a CS or PS session of interests to the service network through the target cellular station after termination.

Figure 9:
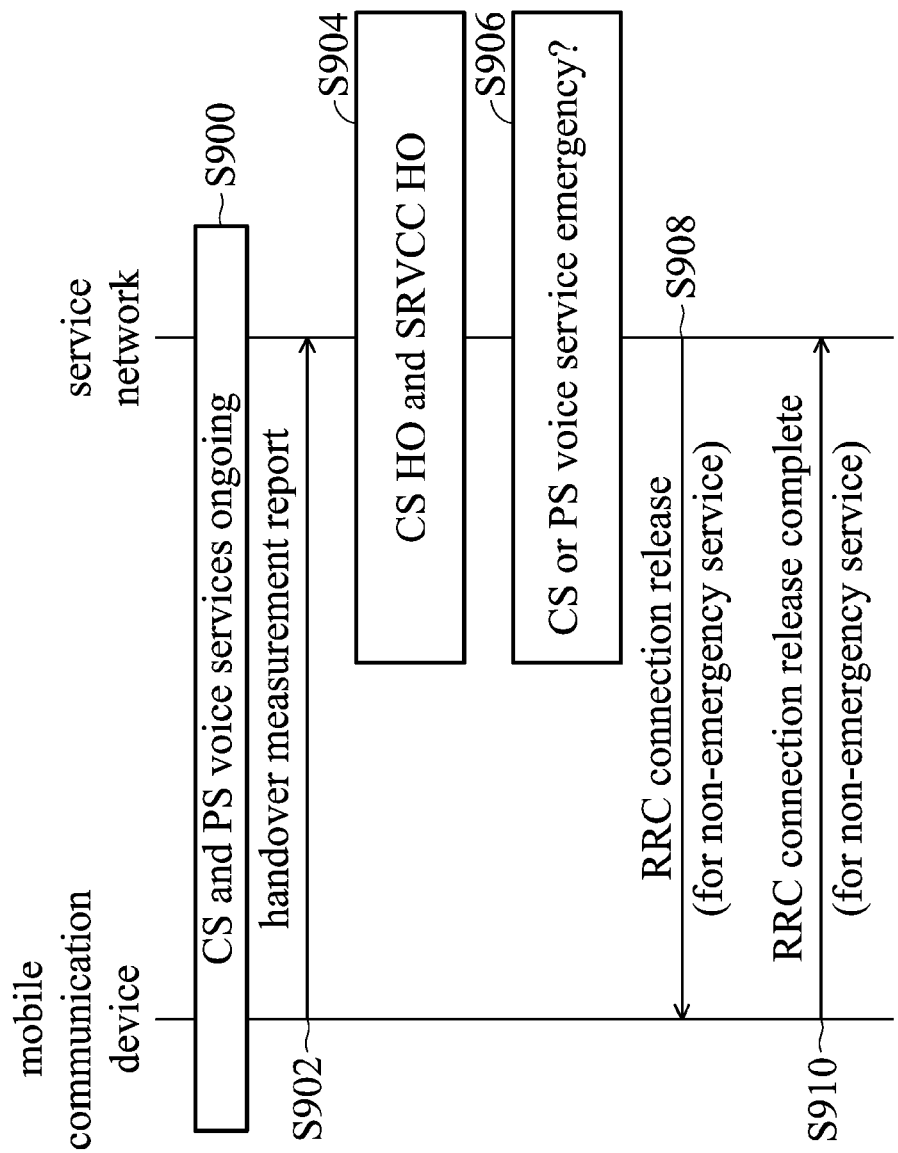
FIG. 9 is a message sequence chart illustrating another handover procedure for CS and PS voice services according to another embodiment of the invention.

FIG. 9 is a message sequence chart illustrating another handover procedure for CS and PS voice services according to another embodiment of the invention, incorporating the service network and the mobile communication device in FIG. 1 and FIG. 2. As the mobile communication device moves during receiving the CS and PS voice services (S900), the service network receives a handover measurement report indicating the radio condition of radio the connection to the source cellular station and to the neighboring cellular stations (S902). The CS voice service comprises circuit teleservices and bear services. The PS voice service comprises Push to talk over cellular (PoC) services, Multimedia Messaging Services (MMS), Point-to-Point (P2P) services, Point-to-Multipoint (P2M) services, and IMS services. As the mobile communication device moves toward the target cellular station, the service network can determines a handover of the PS and CS voice services from the source cellular station to the target cellular station based on the handover measurement report (S904). Next, the service network determines whether only one of the PS and CS voice services is an emergency service (S906). If so, the service network terminates the non-emergency service, releases established resources for the non-emergency service, performs the CS or SRVCC handover procedure for the emergency service to transfer the service to the target cellular station, and then transmits an RRC connection release message to the mobile communication device (S908) to stop ongoing timers and release established resources associated with the non-emergency service. In return, the service network receives an RRC connection release complete message from the mobile communication device to be informed of the completion of the RRC connection release procedure (S910). If the CS and PS voice services are both of the same service type, i.e., both are emergency services or non-emergency services, the service network terminates any one of the PS and CS voice services and performs the handover procedure for the service not terminated to transmit the service to the target cellular station. The emergency service is a telecommunication service that terminates at a national or local emergency center. Provision of location information of the emergency center is a mandatory feature in some countries. An IMS emergency service is indicated in the attach procedure by Attach Type "GPRS Emergency Attach". A CS emergency service includes a bit indicating request for the emergency service in the signaling, which triggers special procedures to route calls based on location rather than dialed numbers. The established resources comprise the MM context, the PDP context, the EPS bearer context, and the logical links.

Figure 10:
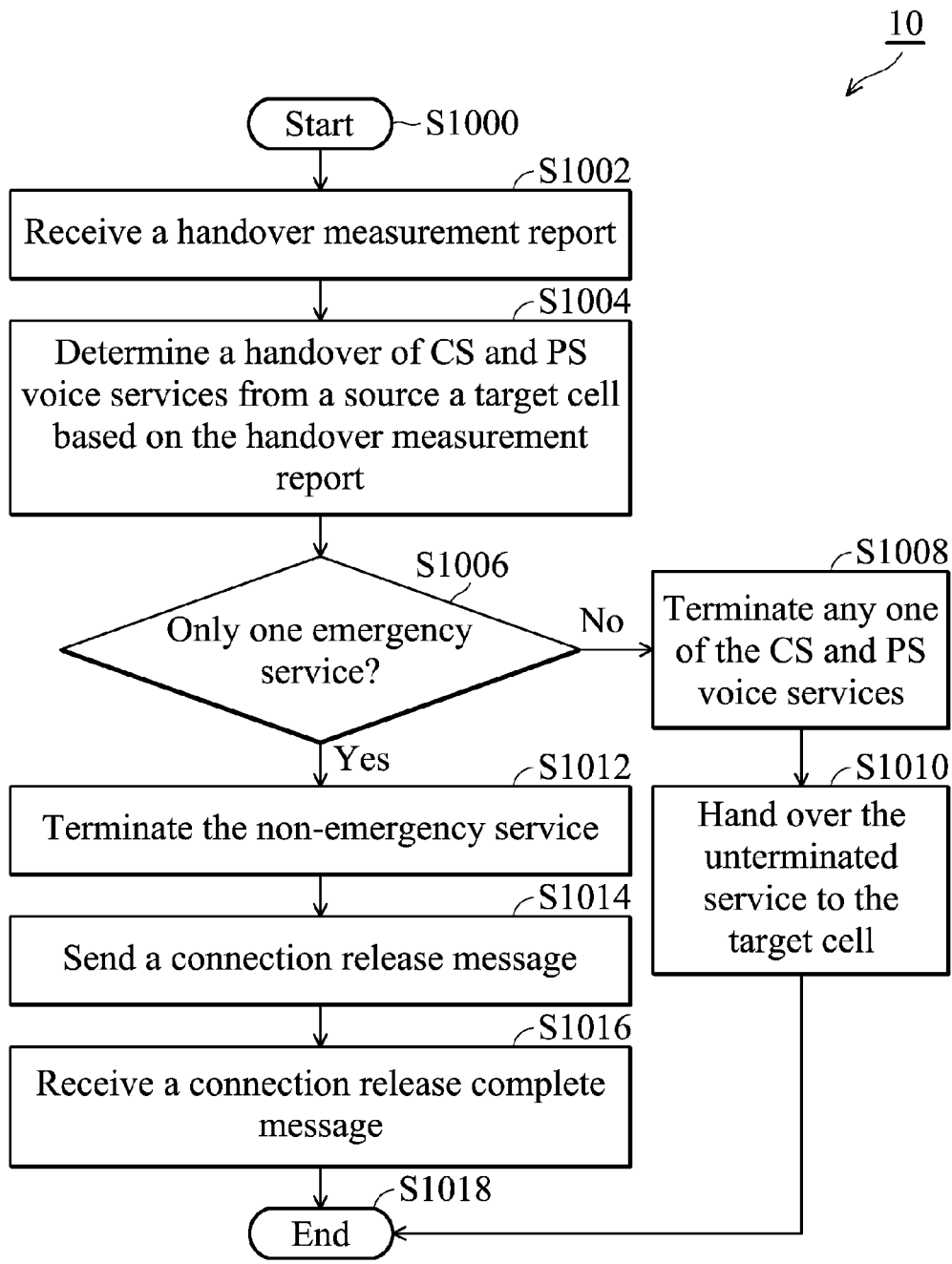
FIG. 10 is a flowchart of another handover method, handing over CS and PS voice services by a service network according to another embodiment of the invention.

FIG. 10 is a flowchart of another handover method, handing over CS and PS voice services by a service network according to another embodiment of the invention, incorporating the service network and the mobile communication device in FIG. 1 and FIG. 2. Upon startup of the handover method 10, the service network provides the CS and PS voice services to the mobile communication device (S1000). The CS voice service comprises circuit teleservices and bear services. The PS voice service comprises Push to talk over cellular (PoC) services, Multimedia Messaging Services (MMS), Point-to-Point (P2P) services, Point-to-Multipoint (P2M) services, and IMS services. The service network receives a handover measurement report from the mobile communication device that indicates the radio condition of radio the connection to the source cellular station and to other neighboring cellular stations (S1002). As the mobile communication device moves toward a target cellular station, the radio condition associated therewith exceeds that with the source cellular station. Therefore, the service network determines a handover of CS and PS voice services from the source cellular station to the target cellular station based on the radio condition in the handover measurement report (S1004). Upon the determination for the handover to the target cellular station, the service network determines whether only one of the PS and CS voice services is an emergency service (S1006). The emergency service type is identified by Attach Type "GPRS Emergency Attach" in the PS attach procedure, or by a bit indicating request for the emergency service in the signaling, which triggers special procedures to route calls based on location rather than dialed numbers in the CS voice service. The service network can assign a higher service priority to an emergency service over the non-emergency service. The emergency service is a telecommunication service that terminates at a national or local emergency center. Provision of location information of the emergency center is a mandatory feature in some countries. If both of the CS and PS voice services are of emergency or non-emergency types, the service network terminates only one of the CS and PS voice services (S1008) by releasing established resources for the terminated service, and hands over the service not terminated to the target cellular station (S1010), and exits the handover method 10 (S1018). If only one of the CS and PS voice services is an emergency service, the service network terminates the non-emergency service and releases established resources associated therewith (S1012), and sends a connection release message such as an RRC connection release message to the mobile communication device to stop any timer that is ongoing and release established resources associated with the terminated service (S1014). The established resources comprise the MM context, the PDP context, the EPS bearer context, and the logical links. In return, the service network receives a connection release complete message such as an RRC connection release complete message from the mobile communication device to be informed of the completion of the network resource release (S1016). The handover method 10 is then completed and exited (S1018). After the completion of the handover method 10, the service network performs a handover procedure to transfer the remaining service from the source cellular station to the target cellular station.

Figure 11:
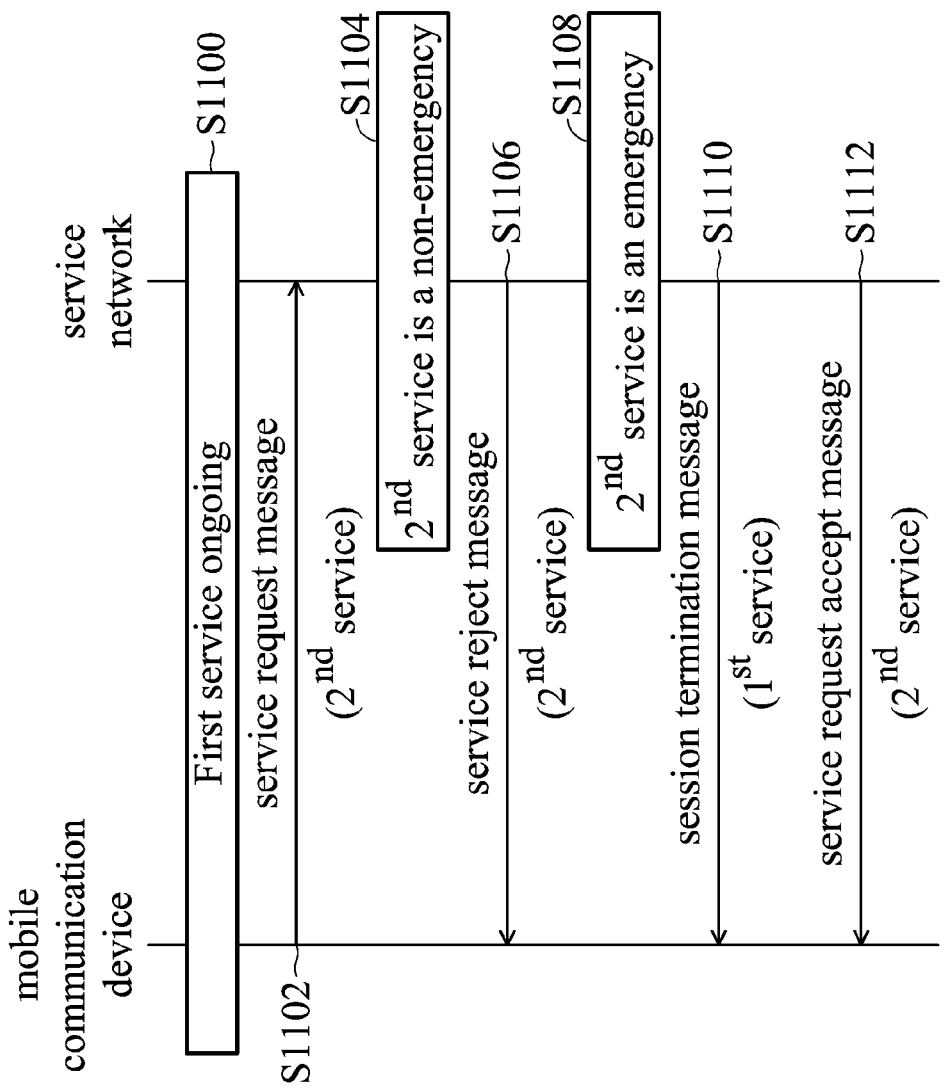
FIG. 11 is a message sequence chart illustrating another CS and PS voice services procedure according to an embodiment of the invention.

FIG. 11 is a message sequence chart illustrating another CS and PS voice services procedure according to an embodiment of the invention, incorporating the service network and the mobile communication device in FIG. 1 and FIG. 2. The service network only supports one service type at one time. The service type comprises a CS voice service type and a PS voice service type. The CS voice service comprises circuit teleservices and bear services. The PS voice service comprises Push to talk over cellular (PoC) services, Multimedia Messaging Services (MMS), Point-to-Point (P2P) services, Point-to-Multipoint (P2M) services, and IMS services. The service network may be a GPRS network operating in the NMO2 mode. The service network receives a service request message from the mobile communication device requesting for a second service with a second service type (S1102) while providing a first service with a first service type to the mobile communication device (S1100). For example, the first service type is a CS voice service and the second service type is an IMS voice service. The service network can assign a higher service priority to an emergency service over the non-emergency service, and determine whether the second service is an emergency service. If the second service is not an emergency service (S1104), the service network transmits a service reject message to the mobile communication device to reject the session establishment request for the second service (S1106). If the second service is an emergency service (S1108), the network service sends a session termination message to the mobile communication device to release the first service (S1110) and sends a service request accept message to the mobile communication device to inform the establishment of a service session for the second service (S1112). The emergency service is a telecommunication service that terminates at a national or local emergency center. Provision of location information of the emergency center is a mandatory feature in some countries. An IMS emergency service is indicated in the attach procedure by Attach Type "GPRS Emergency Attach". A CS emergency service includes a bit indicating request for the emergency service in the signaling, which triggers special procedures to route calls based on location rather than dialed numbers. The service network and the mobile communication device release a service by releasing established resources thereof for the service. The established resources comprise the MM context, the PDP context, the EPS bearer context, and the logical links.

Figure 12:
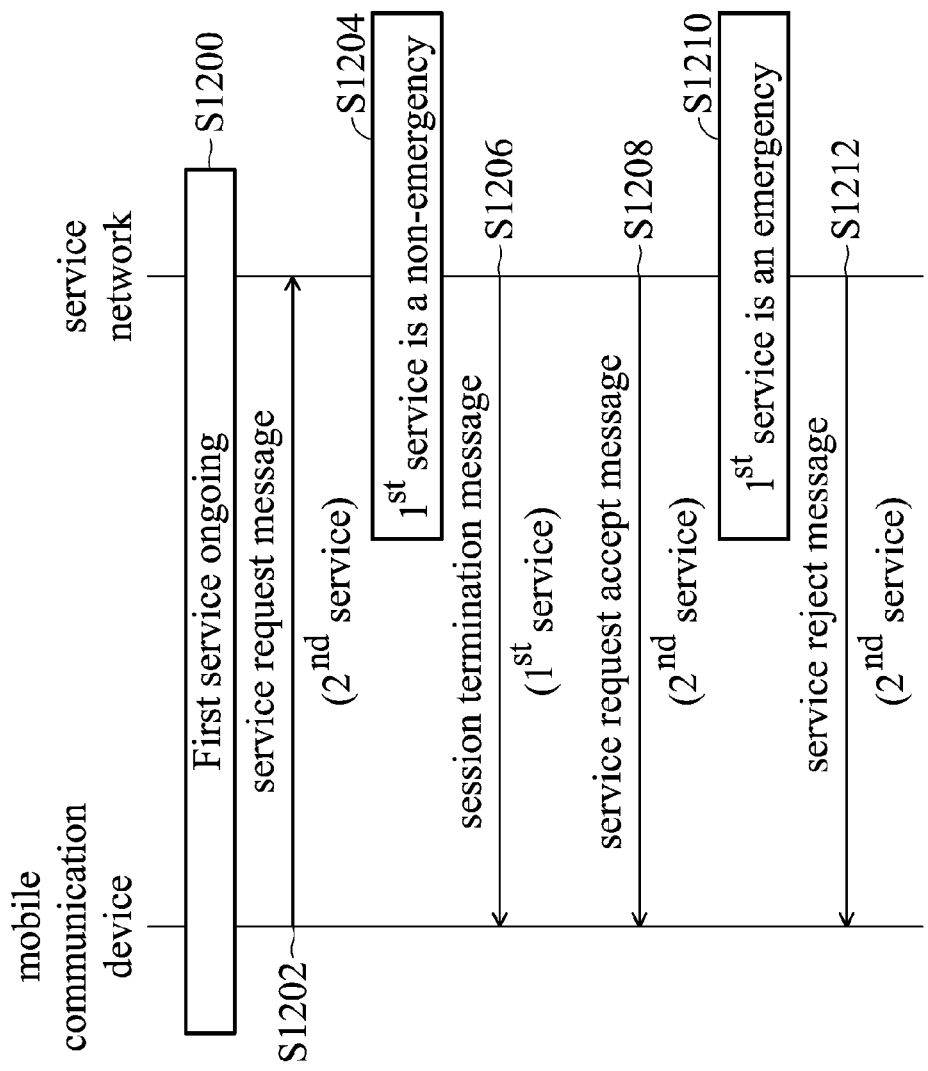
FIG. 12 is a message sequence chart illustrating another CS and PS voice services procedure according to another embodiment of the invention.

FIG. 12 is a message sequence chart illustrating another CS and PS voice services procedure by a service network according to another embodiment of the invention, incorporating the service network and the mobile communication device in FIG. 1 and FIG. 2. Like FIG. 11, the service network only supports one service type at one time. The service type comprises a CS voice service type and a PS voice service type. The CS voice service comprises circuit teleservices and bear services. The PS voice service comprises Push to talk over cellular (PoC) services, Multimedia Messaging Services (MMS), Point-to-Point (P2P) services, Point-to-Multipoint (P2M) services, and IMS services. The service network may be a GPRS network operating in the NMO2 mode. The service network receives a service request message from the mobile communication device requesting for a second service with a second service type (S1202) while providing a first service with a first service type to the mobile communication device (S1200). For example, the first service type is a CS voice service and the second service type is an IMS voice service. The service network assigns a higher service priority to the emergency service over the non-emergency service, and determines whether the first service is an emergency service. If the first service is not an emergency service (S1204), the service network transmits a session termination message to the mobile communication device to release the first service (S1206) and a service request accept message to the mobile communication device to inform the establishment of a service session for the second service (S1208). If the first service is an emergency service (S1210), the service network sends a service reject message to the mobile communication device to reject the session establishment request for the second service (S1212). The emergency service is a telecommunication service that terminates at a national or local emergency center. Provision of location information of the emergency center is a mandatory feature in some countries. An IMS emergency service is indicated in the attach procedure by Attach Type "GPRS Emergency Attach". A CS emergency service includes a bit indicating request for the emergency service in the signaling, which triggers special procedures to route calls based on location rather than dialed numbers. The service network and the mobile communication device release a service by releasing established resources thereof for the service. The established resources comprise the MM context, the PDP context, the EPS bearer context, and the logical links.

Figure 13:
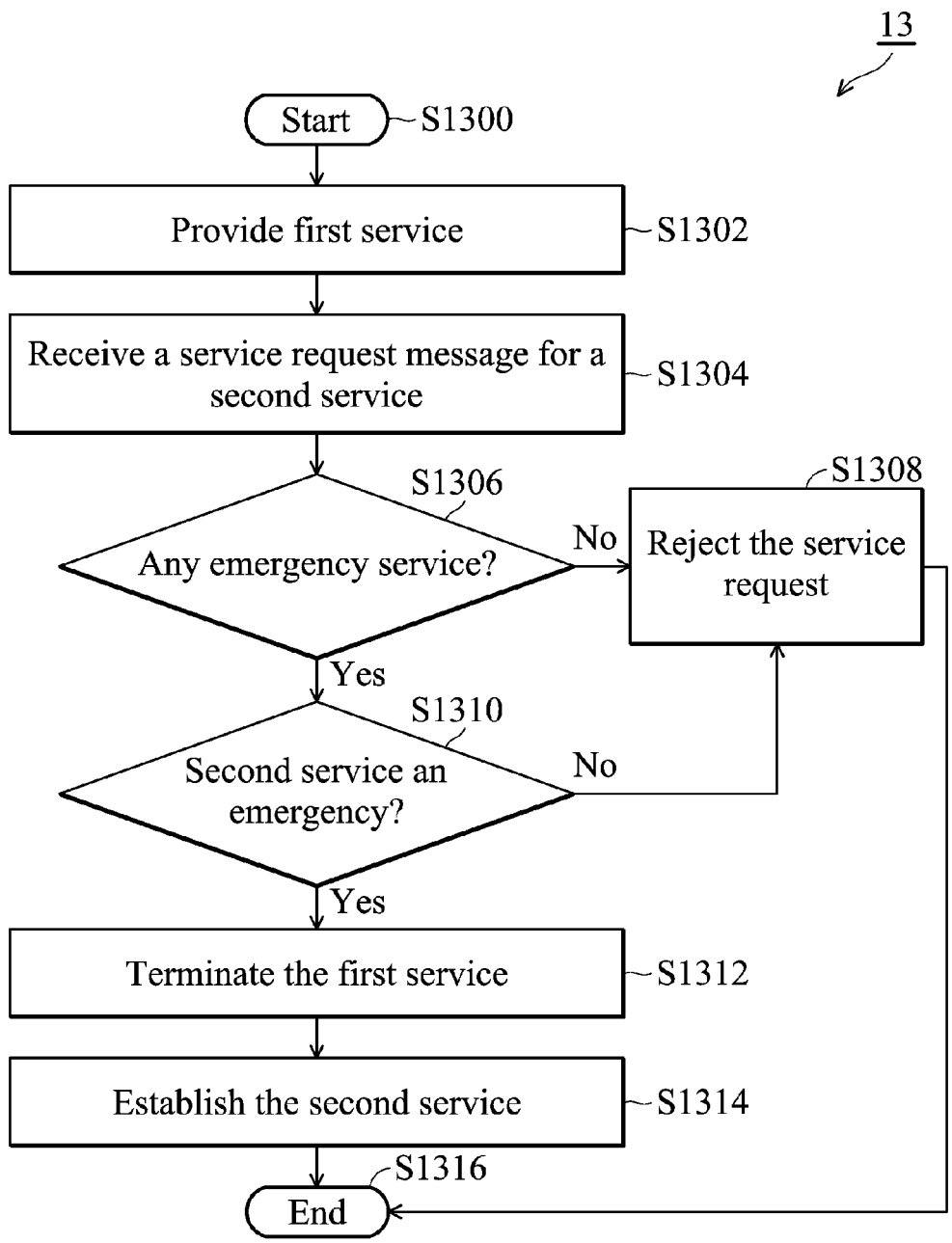
FIG. 13 is a flowchart of a CS and PS voice services provision method, providing CS and PS voice services by a service network according to an embodiment of the invention.

FIG. 13 is a flowchart of a CS and PS voice services provision method, providing CS and PS voice services by a service network according to an embodiment of the invention, incorporating the service network and the mobile communication device in FIG. 1 and FIG. 2. The service network only supports one service type at one time. The service type comprises a CS voice service type and a PS voice service type. The CS voice service comprises circuit teleservices and bear services. The PS voice service comprises Push to talk over cellular (PoC) services, Multimedia Messaging Services (MMS), Point-to-Point (P2P) services, Point-to-Multipoint (P2M) services, and IMS services. The service network may be a GPRS network operating in the NMO2 mode. Upon startup of the method 13, the service network is initiated to provide CS or PS voice services to the mobile communication device (S1300). While providing a first service with a first service type to the mobile communication device (S1302), the service network receives a service request message requesting for a second service with a second service type (S1304). For example, the first service type is a CS voice service and the second service type is an IMS voice service. The service network assigns a higher service priority to the emergency service over the non-emergency service. The service network then determines whether an emergency service is present in the first and second services (S1306). If so, the CS and PS voice services provision method 13 continues at Step S1310. If neither the first nor second service is an emergency service, the service network rejects the service request by transmitting a service reject message to the mobile communication device (S1308) to reject session establishment for the second service type. The service network assigns the service priority of the ongoing first service to exceed that of the requested second service. If the first or second service is an emergency service, the service network further determines whether the second service is an emergency service (S1310). If so, the service network terminates the first service (S1312), issues a session termination message to the mobile communication device to release the first service, establishes the second service (S1314), and transmits a service request accept message to the mobile communication device to inform the establishment of the session of the second service. And if the second service is not an emergency service, the CS and PS voice services provision method 13 returns to step S1308 to reject the service request of the second service. The method 13 is then completed and exited (S1316). The emergency service is a telecommunication service that terminates at a national or local emergency center. Provision of location information of the emergency center is a mandatory feature in some countries. An IMS emergency service is indicated in the attach procedure by Attach Type "GPRS Emergency Attach". A CS emergency service includes a bit indicating request for the emergency service in the signaling, which triggers special procedures to route calls based on location rather than dialed numbers. The service network and the mobile communication device release a service by releasing established resources thereof for the service. The established resources comprise the MM context, the PDP context, the EPS bearer context, and the logical links.

Figure 14:
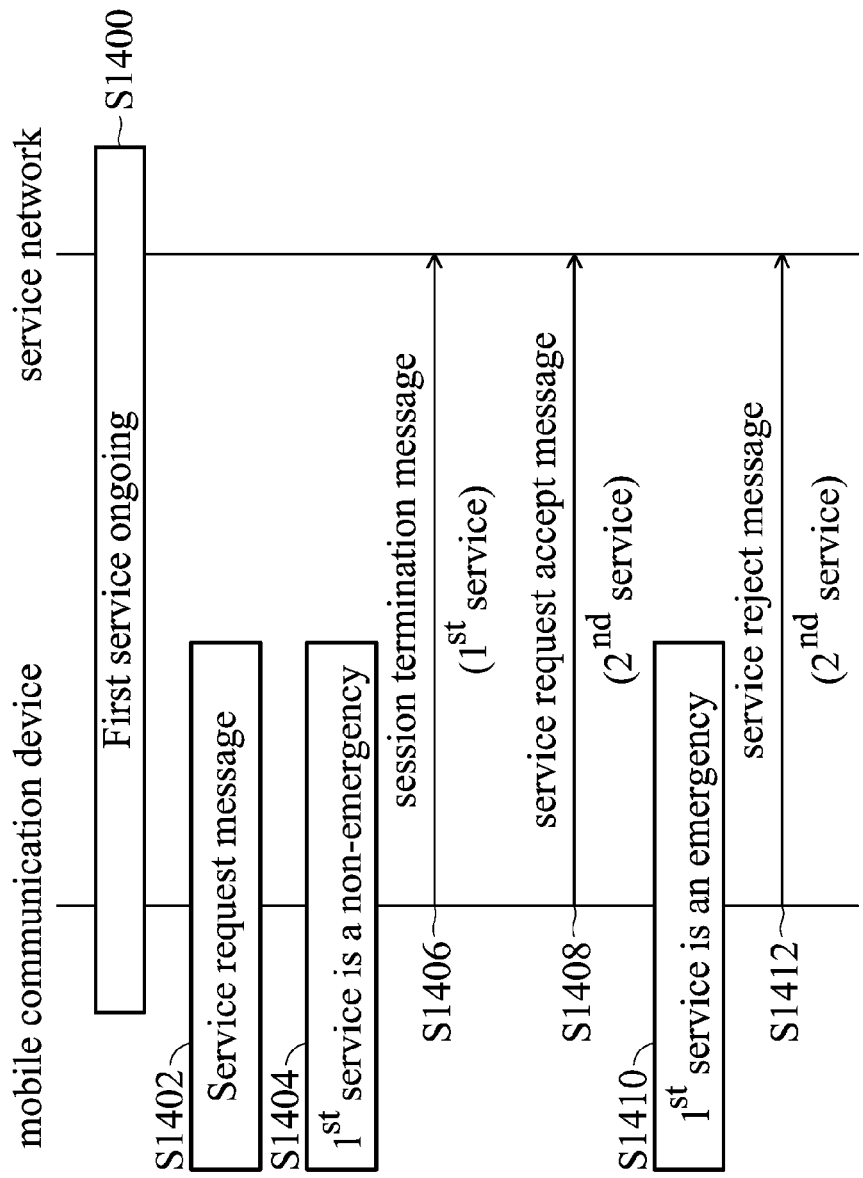
FIG. 14 is a message sequence chart illustrating a CS and PS voice services procedure by a mobile communication device according to an embodiment of the invention.

FIG. 14 is a message sequence chart illustrating a CS and PS voice services procedure by a mobile communication device according to an embodiment of the invention, incorporating the service network and the mobile communication device in FIG. 1 and FIG. 2. The mobile communication device only supports one service type at one time, and may be a Class B Mobile Station (MS) according to the GPRS classification. The service type comprises a CS voice service type and a PS voice service type. The CS voice service comprises circuit teleservices and bear services. The PS voice service comprises Push to talk over cellular (PoC) services, Multimedia Messaging Services (MMS), Point-to-Point (P2P) services, Point-to-Multipoint (P2M) services, and IMS services. The mobile communication device receives a service request message from the service network requesting for a second service with a second service type (S1402) while receiving a first service with a first service type to the mobile communication device (S1400). In one example, the first service type is a CS voice service and the second service type is an IMS voice service. The mobile communication device assigns a higher service priority to an emergency service over the non-emergency service, and determines whether the first service is an emergency service. If the first service is not an emergency service (S1404), the mobile communication device transmits a session termination message to the service network to release established resources for the first service (S1406) and a service request accept message to the service network to inform the service network that establishment of a session for the second service is available (S1408). If the first service is an emergency service (S1410), the mobile communication device sends a service reject message to the service network to reject the session establishment request for the second service (S1412). The emergency service is a telecommunication service that terminates at a national or local emergency center. Provision of location information of the emergency center is a mandatory feature in some countries. An IMS emergency service is indicated in the attach procedure by Attach Type "GPRS Emergency Attach". A CS emergency service includes a bit indicating request for the emergency service in the signaling, which triggers special procedures to route calls based on location rather than dialed numbers. The service network and the mobile communication device release a service by releasing established resources thereof for the service. The established resources comprise the MM context, the PDP context, the EPS bearer context, and the logical links.

Figure 15:
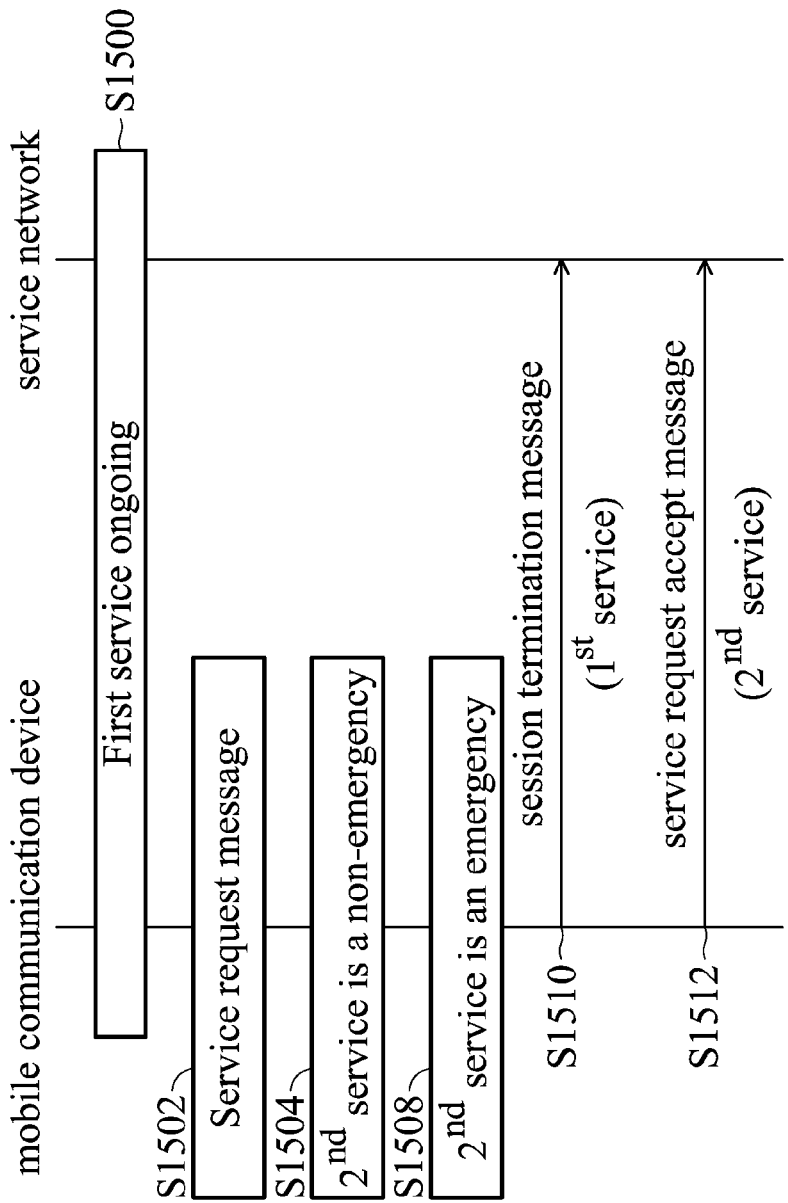
FIG. 15 is a message sequence chart illustrating another CS and PS voice services procedure by a mobile communication device according to another embodiment of the invention.

FIG. 15 is a message sequence chart illustrating another CS and PS voice services procedure by a mobile communication device according to another embodiment of the invention, incorporating the service network and the mobile communication device in FIG. 1 and FIG. 2. The mobile communication device only supports one service type at one time, and may be a Class B Mobile Station (MS) according to the GPRS classification. The service type comprises a CS voice service type and a PS voice service type. The CS voice service comprises circuit teleservices and bear services. The PS voice service comprises Push to talk over cellular (PoC) services, Multimedia Messaging Services (MMS), Point-to-Point (P2P) services, Point-to-Multipoint (P2M) services, and IMS services. The mobile communication device receives a service request message from the service network requesting for a second service with a second service type (S1502) while receiving a first service with a first service type to the mobile communication device (S1500). In one example, the first service type is a CS voice service and the second service type is an IMS voice service. The mobile communication device assigns a higher service priority to an emergency service over the non-emergency service, and determines whether the second service is an emergency service. If the second service is an emergency service (S1508), the mobile communication device sends a session termination message to the service network to release the first service (S1510) and sends a service request accept message to the service network to inform which the establishment of a service session for the second service (S1512). The emergency service is a telecommunication service that terminates at a national or local emergency center. Provision of location information of the emergency center is a mandatory feature in some countries. An IMS emergency service is indicated in the attach procedure by Attach Type "GPRS Emergency Attach". A CS emergency service includes a bit indicating request for the emergency service in the signaling, which triggers special procedures to route calls based on location rather than dialed numbers. The service network and the mobile communication device release a service by releasing established resources thereof for the service. The established resources comprise the MM context, the PDP context, the EPS bearer context, and the logical links.

Figure 16:
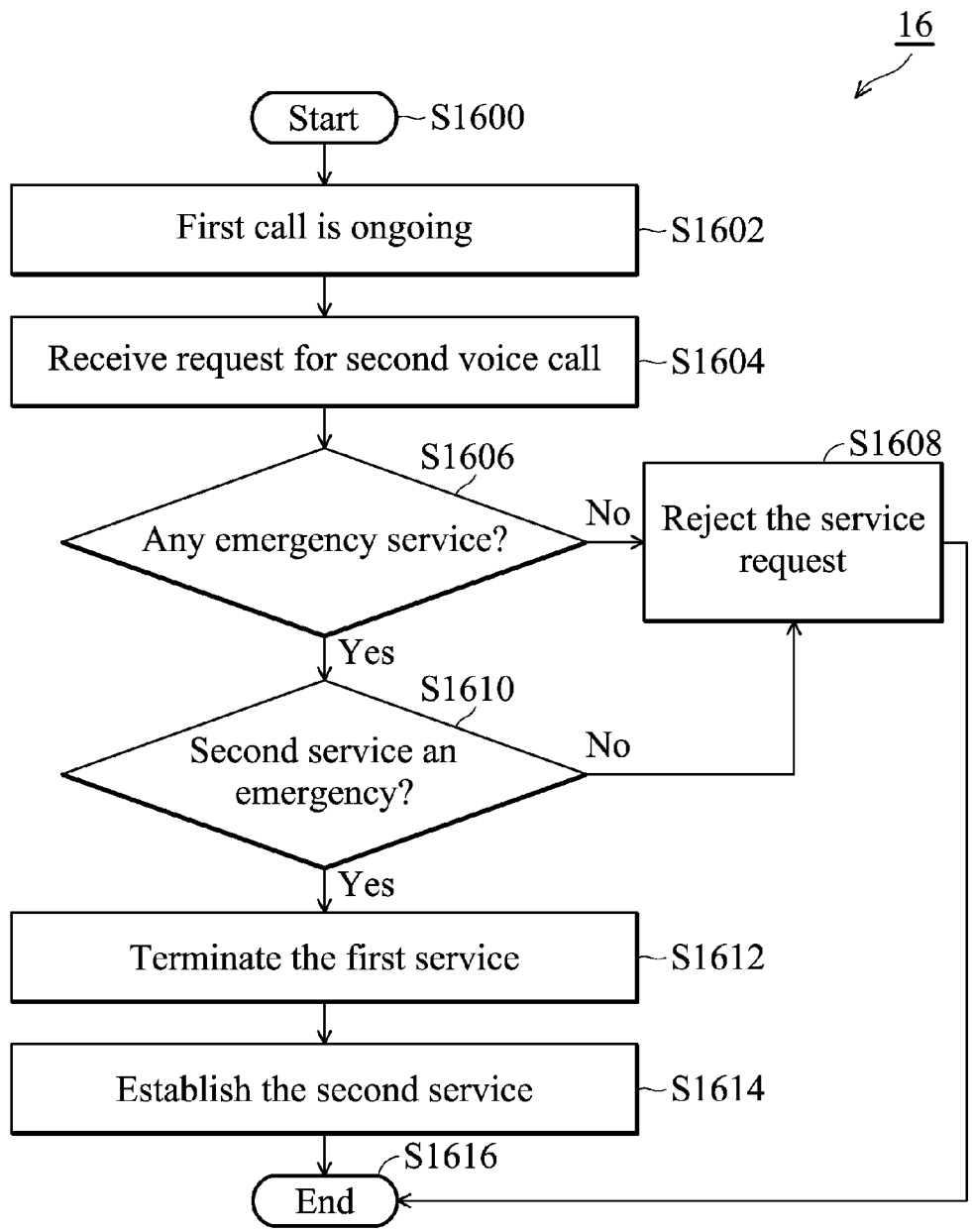
FIG. 16 is a flowchart of a CS and PS voice services method, handling CS and PS voice services by a mobile communication device according to an embodiment of the invention.

FIG. 16 is a flowchart of a CS and PS voice services method, handling CS and PS voice services by a mobile communication device according to an embodiment of the invention, incorporating the service network and the mobile communication device in FIG. 1 and FIG. 2. The mobile communication device only supports one service type at one time, and may be a Class B Mobile Station (MS) according to the GPRS classification. The service type comprises a CS voice service type and a PS voice service type. The CS voice service comprises circuit teleservices and bear services. The PS voice service comprises Push to talk over cellular (PoC) services, Multimedia Messaging Services (MMS), Point-to-Point (P2P) services, Point-to-Multipoint (P2M) services, and IMS services. Upon startup of the CS and PS voice service handling method 16, the mobile communication device is initiated to receive a CS or PS voice service from the service network (S1600). While receiving a first service with a first service type from the service network (S1602), the mobile communication device receives a service request message requesting for a second service with a second service type (S1604). In one example, the first service type is a CS voice service and the second service type is an IMS voice service. The mobile communication device assigns a higher service priority to the emergency service over the non-emergency service. The mobile communication device then determines whether an emergency service is present in the first and second services (S1606). If so, the CS and PS voice services handling method 16 continues at Step S1610. If neither the first nor second service is an emergency service, the mobile communication device rejects the service request by transmitting a service reject message to the service network (S1608) to reject session establishment for the second service. The mobile communication device also assigns the service priority of the ongoing first service to exceed that of the requested second service. If the first or second service is an emergency service, the mobile communication device further determines whether the second service is an emergency service (S1610). If so, the mobile communication device terminates the first service (S1612), issues a session termination message to the service network to release the first service, establishes the second service (S1614), and transmits a service request accept message to the service network to inform which that the establishment of the session of the second service is ready. If the second service is not an emergency service, the CS and PS voice services handling method 16 returns to step S1608 to reject the service request of the second service. The method 16 is then completed and exited (S1616). The emergency service is a telecommunication service that terminates at a national or local emergency center. Provision of location information of the emergency center is a mandatory feature in some countries. An IMS emergency service is indicated in the attach procedure by Attach Type "GPRS Emergency Attach". A CS emergency service includes a bit indicating request for the emergency service in the signaling, which triggers special procedures to route calls based on location rather than dialed numbers. The service network and the mobile communication device release a service by releasing established resources thereof for the service. The established resources comprise the MM context, the PDP context, the EPS bearer context, and the logical links.

Figure 17:
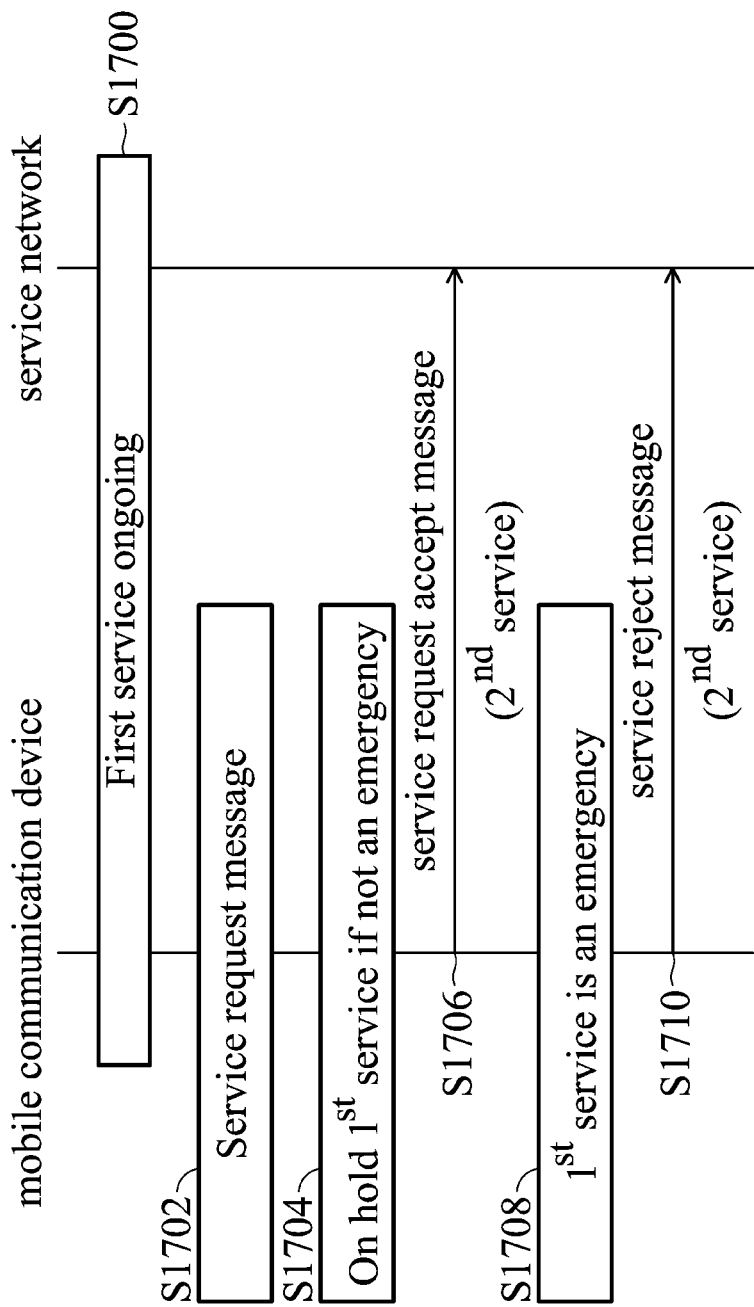
FIG. 17 is a message sequence chart illustrating another CS and PS voice services procedure by a mobile communication device according to another embodiment of the invention.

FIG. 17 is a message sequence chart illustrating another CS and PS voice services procedure by a mobile communication device according to another embodiment of the invention, incorporating the service network and the mobile communication device in FIG. 1 and FIG. 2. The mobile communication device only supports one service type at one time, and may be a Class B Mobile Station (MS) according to the GPRS classification. The service type comprises a CS voice service type and a PS voice service type. The CS voice service comprises circuit teleservices and bear services. The PS voice service comprises Push to talk over cellular (PoC) services, Multimedia Messaging Services (MMS), Point-to-Point (P2P) services, Point-to-Multipoint (P2M) services, and IMS services. The mobile communication device receives a service request message from the service network requesting for a second service with a second service type (S1702) while receiving a first service with a first service type to the mobile communication device (S1700). In one example, the first service type is a CS voice service and the second service type is an IMS voice service. The mobile communication device assigns a higher service priority to an emergency service over the non-emergency service, and the second service over the first service. The mobile communication device determines whether the first service is an emergency service. If the first service is not an emergency service (S1704), the mobile communication device suspends or puts the first service on hold (S1704) and transmits a service request accept message to the service network to inform which that establishment of a session for the second service is ready (S1706). If the first service is an emergency service (S1708), the mobile communication device sends a service reject message to the service network to reject the establishment of the session of the second service (S1710). The emergency service is a telecommunication service that terminates at a national or local emergency center. Provision of location information of the emergency center is a mandatory feature in some countries. An IMS emergency service is indicated in the attach procedure by Attach Type "GPRS Emergency Attach". A CS emergency service includes a bit indicating request for the emergency service in the signaling, which triggers special procedures to route calls based on location rather than dialed numbers. The service network and the mobile communication device release a service by releasing established resources thereof for the service. The established resources comprise the MM context, the PDP context, the EPS bearer context, and the logical links.

Figure 18:
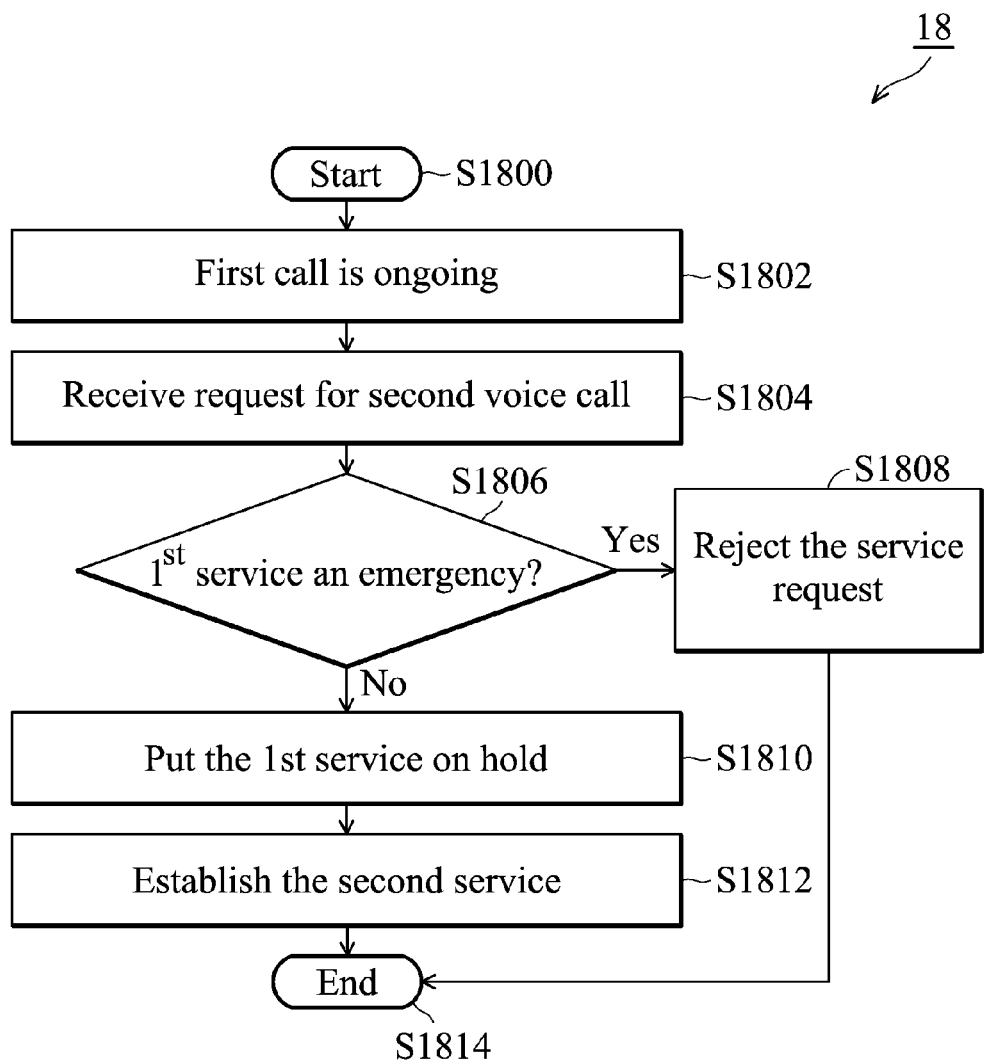
FIG. 18 is a flowchart of another CS and PS voice services method, handling CS and PS voice services by a mobile communication device according to another embodiment of the invention.

FIG. 18 is a flowchart of another CS and PS voice services method, handling CS and PS voice services by a mobile communication device according to another embodiment of the invention, incorporating the service network and the mobile communication device in FIG. 1 and FIG. 2. The mobile communication device only supports one service type at one time, and may be a Class B Mobile Station (MS) according to the GPRS classification. The service type comprises a CS voice service type and a PS voice service type. The CS voice service comprises circuit teleservices and bear services. The PS voice service comprises Push to talk over cellular (PoC) services, Multimedia Messaging Services (MMS), Point-to-Point (P2P) services, Point-to-Multipoint (P2M) services, and IMS services. Upon startup of the CS and PS voice service handling method 18, the mobile communication device is initiated to receive a CS or PS voice service from the service network (S1800). While receiving a first service with a first service type from the service network (S1802), the mobile communication device receives a service request message requesting for a second service with a second service type (S1804). In one example, the first service type is a CS voice service and the second service type is an IMS voice service. The mobile communication device assigns a higher service priority to the emergency service over the non-emergency service, and the second service over the first service. The mobile communication device determines whether the first service is an emergency service (S1806). If so, the mobile communication device continues receiving the first service from the service network, rejects the service request by transmitting a service reject message to the service network (S1808) to reject session establishment for the second service, and exits the CS and PS voice service handling method (S1814). If the first service is not an emergency service, the mobile communication device then suspends or puts the first service on hold (S1810), prepares for receiving the second service from the service network (S1812), and sends a service request accept message to the service network to inform which that the second service establishment is ready. The method 18 is then completed and exited (S1814). The emergency service is a telecommunication service that terminates at a national or local emergency center. Provision of location information of the emergency center is a mandatory feature in some countries. An IMS emergency service is indicated in the attach procedure by Attach Type "GPRS Emergency Attach". A CS emergency service includes a bit indicating request for the emergency service in the signaling, which triggers special procedures to route calls based on location rather than dialed numbers. The service network and the mobile communication device release a service by releasing established resources thereof for the service. The established resources comprise the MM context, the PDP context, the EPS bearer context, and the logical links.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

The operations and functions of the various logical blocks, modules, and circuits described herein may be implemented in circuit hardware or embedded software codes that can be accessed and executed by a processor.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A handover method, simultaneously handing over both a circuit-switched (CS) voice service and a packet switched voice (PS) voice service of a mobile communication device by a service network from a source cellular station to a target cellular station, wherein the source cellular station simultaneously supports both the CS and the PS voice service and the target cellular station supports the CS voice service only, the handover method comprising:
   determining, by the service network, to simultaneously perform a handover procedure of both the CS voice service and the PS voice service from the source cellular station to the target cellular station based on a handover measurement of a radio connection between the source cellular station and the mobile communication device;
   determining, by the service network, whether the CS voice service or the PS voice service is an emergency service;
   terminating a non-emergency service of the CS voice service and the PS voice service when one service is the emergency service and other is the non-emergency service; and
   terminating any one of the CS voice service and the PS voice service when both services are the non-emergency service.

* * * * *